(12) United States Patent
Tao et al.

(10) Patent No.: US 12,231,971 B2
(45) Date of Patent: Feb. 18, 2025

(54) USER EQUIPMENT AND BASE STATION INVOLVED IN A HANDOVER

(71) Applicant: Panasonic Intellectual Property Corporation of America, Torrance, CA (US)

(72) Inventors: Ming-Hung Tao, Frankfurt am Main (DE); Hidetoshi Suzuki, Kanagawa (JP); Rikin Shah, Langen (DE); Akihiko Nishio, Osaka (JP); Hongchao Li, Langen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 422 days.

(21) Appl. No.: 17/631,398

(22) PCT Filed: Aug. 5, 2020

(86) PCT No.: PCT/EP2020/072029
§ 371 (c)(1),
(2) Date: Jan. 28, 2022

(87) PCT Pub. No.: WO2021/058186
PCT Pub. Date: Apr. 1, 2021

(65) Prior Publication Data
US 2022/0345961 A1    Oct. 27, 2022

(30) Foreign Application Priority Data
Sep. 24, 2019  (EP) .................................... 19199331

(51) Int. Cl.
*H04W 36/00*    (2009.01)
*H04W 56/00*    (2009.01)

(52) U.S. Cl.
CPC . *H04W 36/0077* (2013.01); *H04W 36/00725* (2023.05); *H04W 56/0045* (2013.01)

(58) Field of Classification Search
CPC ......... H04W 36/0072; H04W 36/0077; H04W 36/08; H04W 56/0045; H04W 36/00725;
(Continued)

(56) References Cited

U.S. PATENT DOCUMENTS

2007/0123252 A1*  5/2007  Tronc .................... H04B 7/2125
                                                    455/427

FOREIGN PATENT DOCUMENTS

WO    WO 2017130852 A1    8/2017
WO    WO-2018093939 A1 *  5/2018

OTHER PUBLICATIONS

3GPP TS 38.213 v15.5.5.0 (Mar. 2019), "3rd Generation Partnership Project; Technical Specification Group Radio Access Network; NR; Physical layer procedures for control (Release 15)", Mar. 27, 2019. (Year: 2019).*

(Continued)

*Primary Examiner* — The Hy Nguyen
*Assistant Examiner* — Jesse P. Samluk
(74) *Attorney, Agent, or Firm* — Seed IP Law Group LLP

(57) ABSTRACT

The present disclosure relates to a user equipment (UE) that comprises a receiver of the UE receives, from a source base station of a source radio cell, a common timing advance value for a target radio cell. The UE is connected to the source radio cell and is involved in a handover procedure to hand over the UE from the source radio cell to the target radio cell. Further, the common timing advance value is received from the source base station in a first message of the handover procedure, which also comprises a timing indication for transmitting a second message from the UE to the target base station. Then, a processor of the UE deter- (Continued)

mines a first uplink timing of uplink transmissions to the target base station with respect to downlink transmissions from the target base station, based on the received common timing advance value and the timing indication. A transmitter of the UE transmits a second message of the handover procedure to the target base station based on the determined uplink timing. The processor determines a UE-specific timing advance value, specific to the UE and the target radio cell, to be used by the UE for performing uplink transmissions in the target radio cell.

15 Claims, 11 Drawing Sheets

(58) Field of Classification Search
CPC .......... H04W 56/0005; H04W 36/0061; H04B 7/18504; H04B 7/1851
See application file for complete search history.

(56) References Cited

OTHER PUBLICATIONS

3GPP, "3rd Generation Partnership Project; Technical Specification Group Radio Access Network; Study on Scenarios and Requirements for Next Generation Access Technologies; (Release 15)," 3GPP TR 38.913 V15.0.0, Jun. 2018, 39 pages.
3GPP, "3rd Generation Partnership Project; Technical Specification Group Radio Access Network; NR; NR and NG-RAN Overall Description; Stage 2 (Release 15)," 3GPP TS 38.300 V15.6.0, Jun. 2019, 99 pages.
3GPP, "3rd Generation Partnership Project; Technical Specification Group Radio Access Network; Study on new radio access technology: Radio access architecture and interfaces (Release 14)," 3GPP TR 38.801 V14.0.0, Mar. 2017, 91 pages.
3GPP, "3rd Generation Partnership Project; Technical Specification Group Radio Access Network; NR; Physical channels and modulation (Release 15)," 3GPP TS 38.211 V15.6.0, Jun. 2019, 97 pages.
3GPP, "3rd Generation Partnership Project; Technical Specification Group Services and System Aspects; System Architecture for the 5G System; Stage 2 (Release 16)," 3GPP TS 23.501 V16.1.0, Jun. 2019, 368 pages.
3GPP, "3rd Generation Partnership Project; Technical Specification Group Radio Access Network; NR; Medium Access Control (MAC) protocol specification (Release 15)," 3GPP TS 38.321 V15.6.0, Jun. 2019, 78 pages.
3GPP, "3rd Generation Partnership Project; Technical Specification Group Radio Access Network; NR; Physical layer procedures for control (Release 15)," 3GPP TS 38.213 V15.6.0, Jun. 2019, 107 pages.
3GPP, "3rd Generation Partnership Project; Technical Specification Group Radio Access Network; Solutions for NR to support non-terrestrial networks (NTN) (Release 16)," 3GPP TR 38.821 V0.3.0, Nov. 2018, 33 pages.
3GPP, "3rd Generation Partnership Project; Technical Specification Group Radio Access Network; NG-RAN; Architecture description (Release 15)," 3GPP TS 38.401 V15.6.0, Jul. 2019, 46 pages.
3GPP, "3rd Generation Partnership Project; Technical Specification Group Radio Access Network; NR; Radio Resource Control (RRC) protocol specification (Release 15)," 3GPP TS 38.331 V15.6.0, Jun. 2019, 519 pages.
Ericsson, "Further discussion on RACHless handover for NR," R4-1909551, Agenda item: 9.3.2.2, 3GPP TSG-RAN WG4 Meeting #92, Ljubljana, Slovenia, Aug. 26-30, 2019, 6 pages.
Ericsson, "Non-zero/non equal TA for RACH-less HO for NR mobility enhancement," R4-1906456, Agenda item: 8.3.2, 3GPP TSG-RAN WG4 Meeting #91, Reno, United States of America, May 13-17, 2019, 4 pages.
Extended European Search Report, dated Nov. 5, 2019, for European Application No. 19199331.0, 16 pages.
Huawei, HiSilicon, "RACH-less handover for NTN," R2-1910570 Resubmission of R2-1907781, Agenda item: 11.6.4.1.1, 3GPP TSG-RAN WG2 Meeting #107, Prague, Czech Republic, Aug. 26-30, 2019, 3 pages.
International Search Report, mailed Oct. 6, 2020, for International Application No. PCT/EP2020/072029, 5 pages.
Panasonic, "Timing advance and RACH aspect for NTN," R1-1908818, Agenda Item: 7.2.5.3, 3GPP TSG RAN WG1 #98, Prague, Czech Republic, Aug. 26-30, 2019, 12 pages.
Notice of Reason for Rejection, dispatched Jul. 2, 2020, for Japanese Patent Application 2022-518290. (8 pages) (with English translation).

* cited by examiner

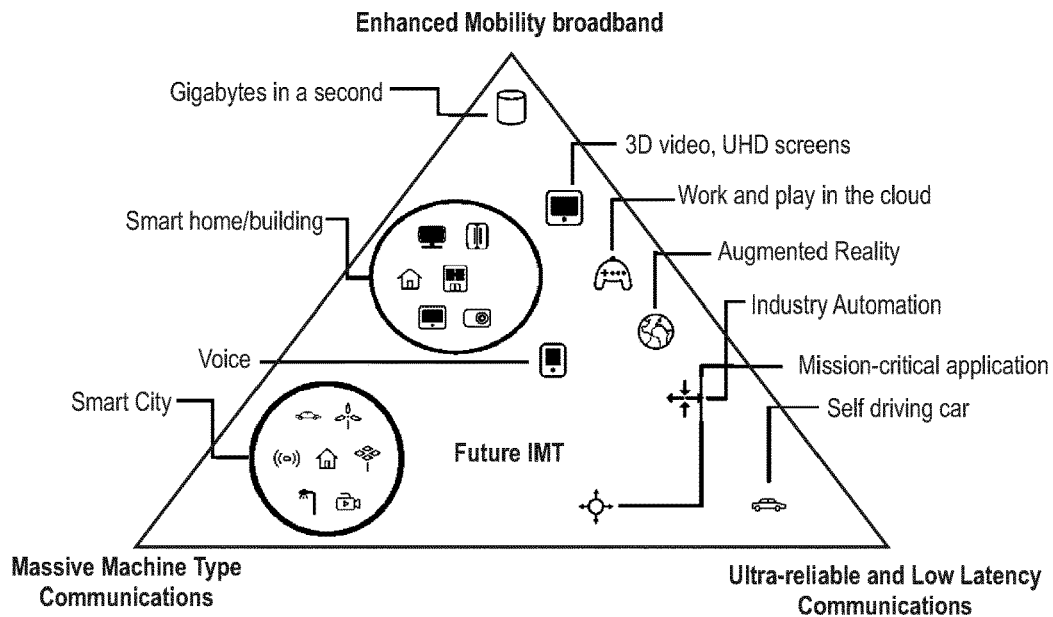
Fig. 5
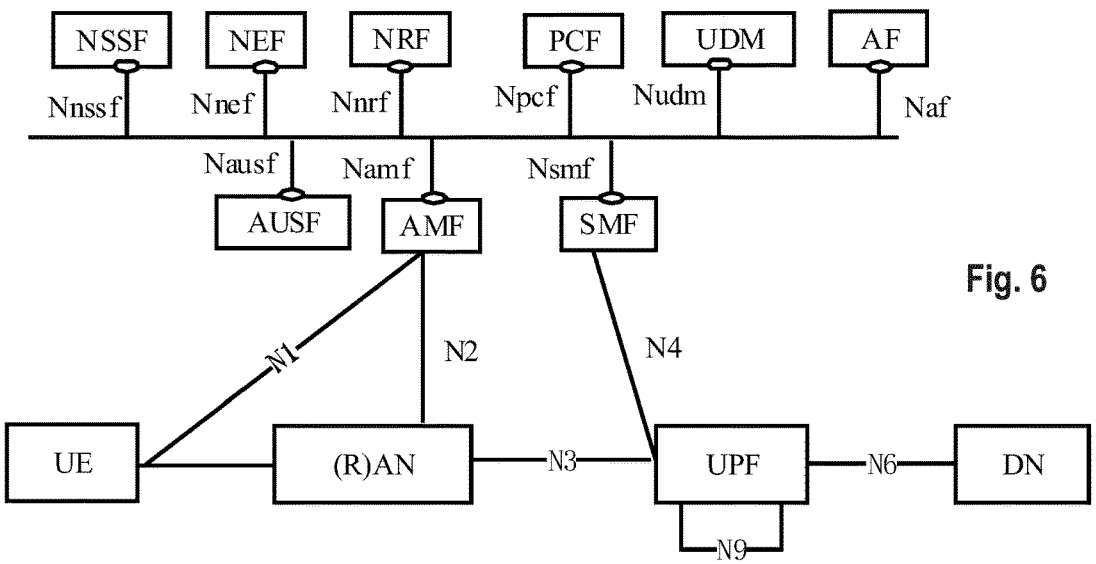
Fig. 6
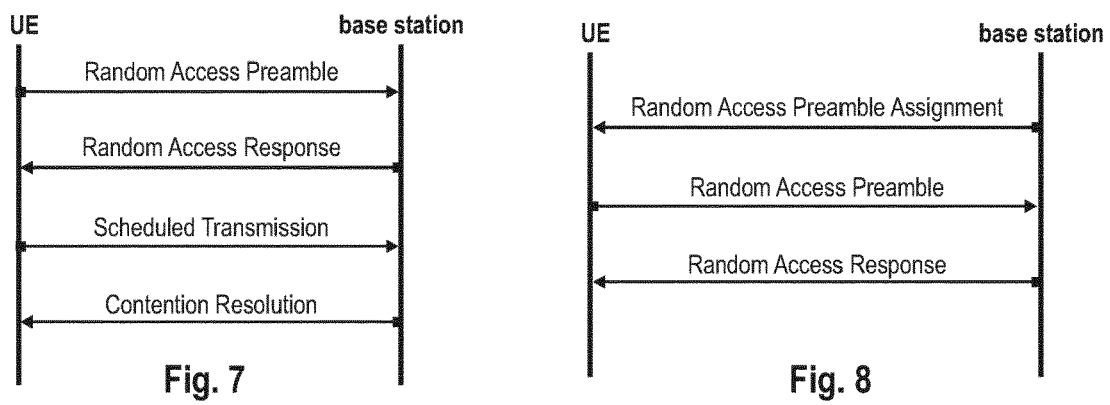
Fig. 7
Fig. 8

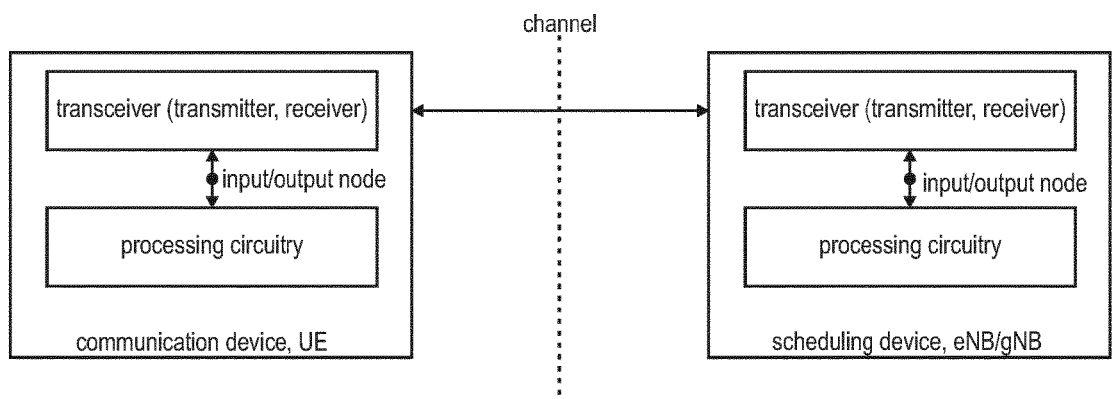
Fig. 17
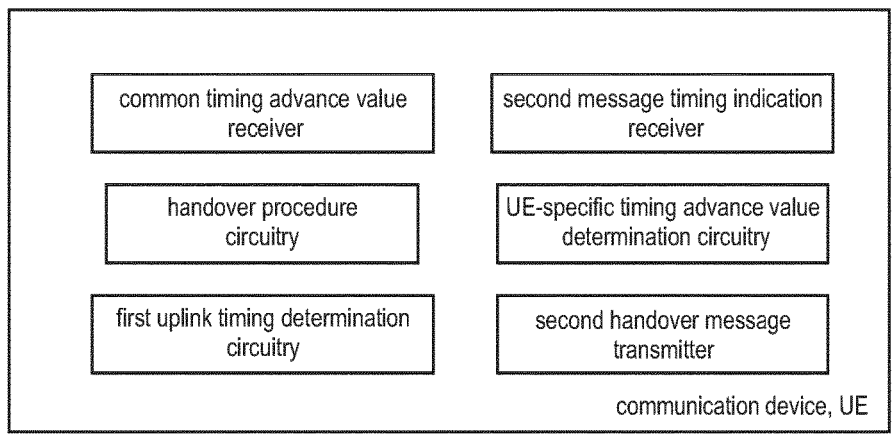
Fig. 18
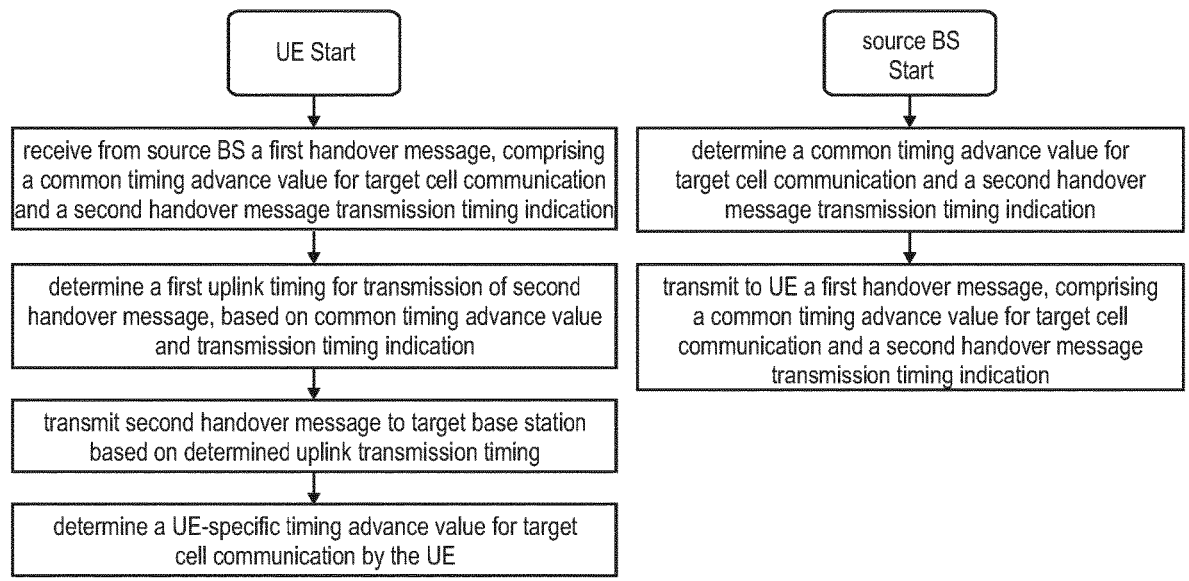
Fig. 19
Fig. 20

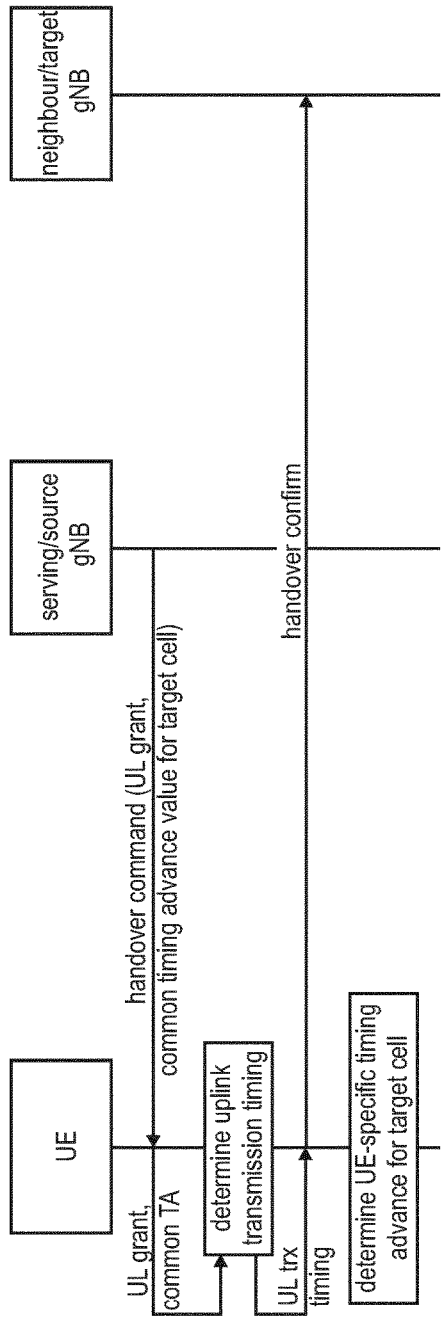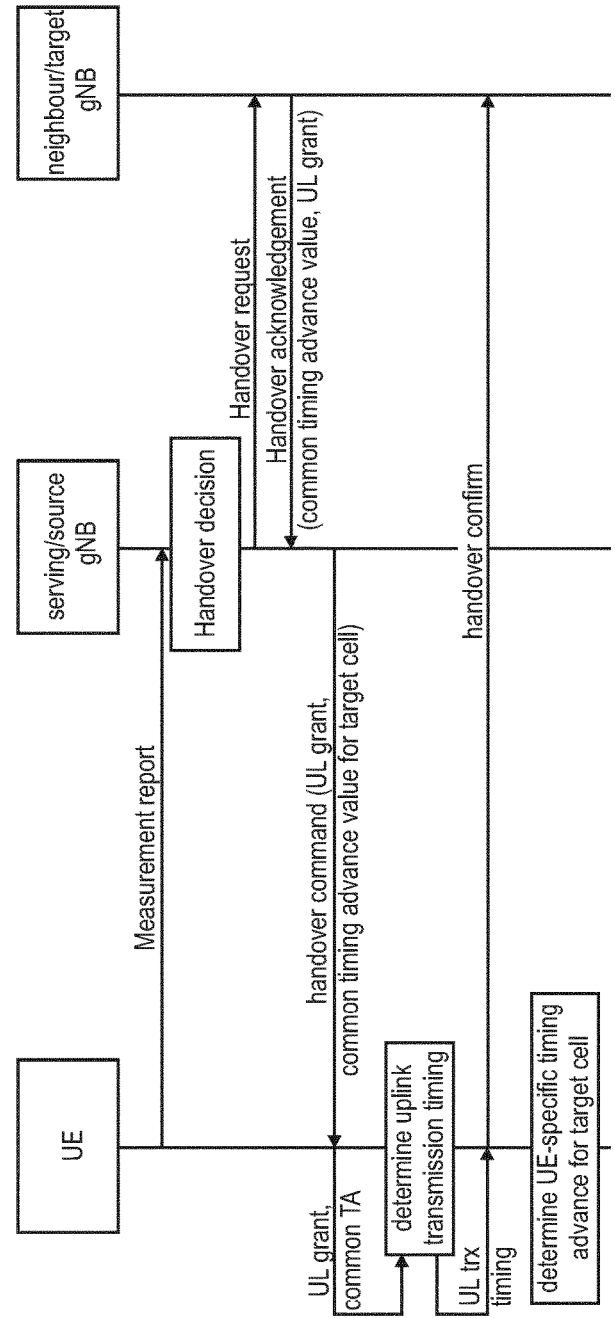

USER EQUIPMENT AND BASE STATION INVOLVED IN A HANDOVER

BACKGROUND

Technical Field

The present disclosure is directed to methods, devices and articles in communication systems, such as 3GPP communication systems.

Description of the Related Art

Currently, the 3rd Generation Partnership Project (3GPP) works at the technical specifications for the next generation cellular technology, which is also called fifth generation (5G).

One objective is to provide a single technical framework addressing all usage scenarios, requirements and deployment scenarios (see, e.g., section 6 of TR 38.913 version 15.0.0), at least including enhanced mobile broadband (eMBB), ultra-reliable low-latency communications (URLLC), massive machine type communication (mMTC). For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC deployment scenarios may include scenarios with large number of devices with non-time critical data transfers such as smart wearables and sensor networks. The services eMBB and URLLC are similar in that they both demand a very broad bandwidth, however are different in that the URLLC service may preferably require ultra-low latencies.

A second objective is to achieve forward compatibility. Backward compatibility to Long Term Evolution (LTE, LTE-A) cellular systems is not required, which facilitates a completely new system design and/or the introduction of novel features.

BRIEF SUMMARY

One non-limiting and exemplary embodiment facilitates providing procedures for facilitating to improve a handover procedure.

In an embodiment, the techniques disclosed here feature a user equipment comprising a receiver of the UE that receives, from a source base station of a source radio cell, a common timing advance value for a target radio cell. The UE is connected to the source radio cell and is involved in a handover procedure to hand over the UE from the source radio cell to the target radio cell. Further, the common timing advance value is received from the source base station in a first message of the handover procedure, which also comprises a timing indication for transmitting a second message from the UE to the target base station. Then, a processor of the UE determines a first uplink timing of uplink transmissions to the target base station with respect to downlink transmissions from the target base station, based on the received common timing advance value and the timing indication. A transmitter of the UE transmits a second message of the handover procedure to the target base station based on the determined uplink timing. The processor determines a UE-specific timing advance value, specific to the UE and the target radio cell, to be used by the UE for performing uplink transmissions in the target radio cell.

It should be noted that general or specific embodiments may be implemented as a system, a method, an integrated circuit, a computer program, a storage medium, or any selective combination thereof.

Additional benefits and advantages of the disclosed embodiments and different implementations will be apparent from the specification and figures. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

In the following exemplary embodiments are described in more detail with reference to the attached figures and drawings.

FIG. 5 is a schematic drawing showing usage scenarios of Enhanced mobile broadband (eMBB), Massive Machine Type Communications (mMTC) and Ultra Reliable and Low Latency Communications (URLLC), FIG. 6 is a block diagram showing an exemplary 5G system architecture for a non-roaming scenario, FIG. 7 illustrates the messages exchanged between an eNB and a UE when performing a contention-based RACH procedure;

FIG. 8 illustrates the messages exchanged between an eNB and a UE when performing a contention-free RACH procedure;

FIG. 17 illustrates the exemplary and simplified structure of a UE and a gNB;

FIG. 18 illustrates a structure of the UE according to an exemplary implementation of an improved handover procedure, FIG. 19 is a flow diagram for the behavior of a UE, according to an exemplary implementation for an improved handover procedure, FIG. 20 is a flow diagram for the behavior of a base station, according to an exemplary implementation for an improved handover procedure, FIG. 21 is a signaling and processing diagram, according to an exemplary implementation for an improved handover procedure, FIG. 22 is a signaling and processing diagram, according to an exemplary implementation for an improved handover procedure.

DETAILED DESCRIPTION

5G NR System Architecture and Protocol Stacks

3GPP has been working at the next release for the 5$^{th}$ generation cellular technology, simply called 5G, including the development of a new radio access technology (NR) operating in frequencies ranging up to 100 GHz. The first version of the 5G standard was completed at the end of 2017, which allows proceeding to 5G NR standard-compliant trials and commercial deployments of smartphones.

Figure 1:
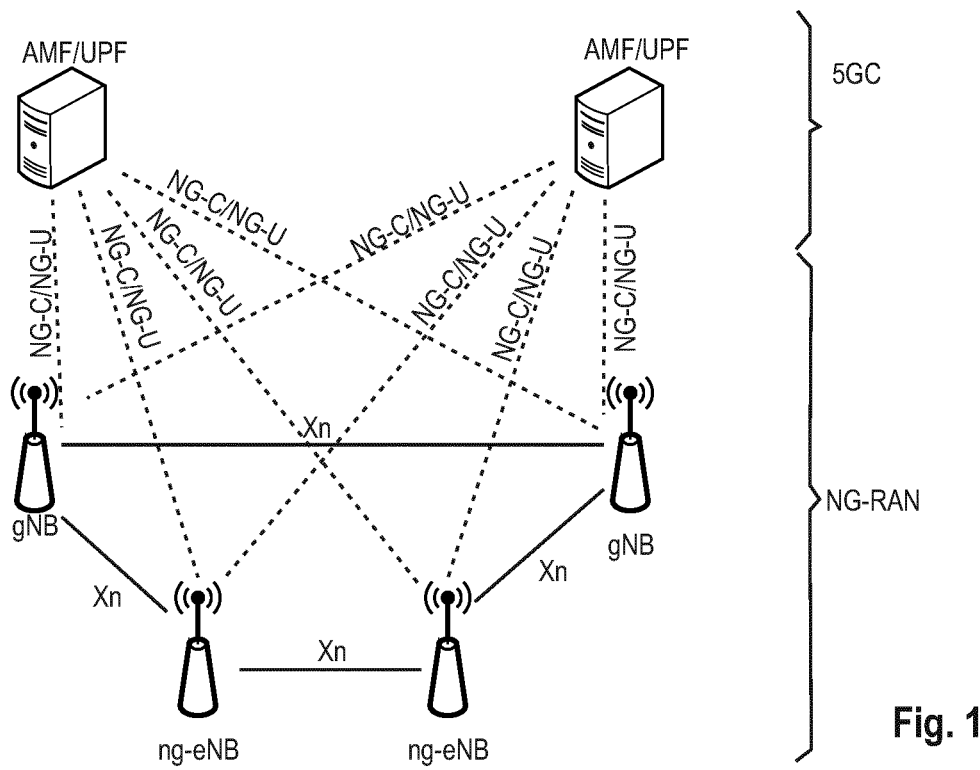
FIG. 1 shows an exemplary architecture for a 3GPP NR system.

Among other things, the overall system architecture assumes an NG-RAN (Next Generation-Radio Access Network) that comprises gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 1 (see, e.g., 3GPP TS 38.300 v15.6.0, section 4).

Figure 2:
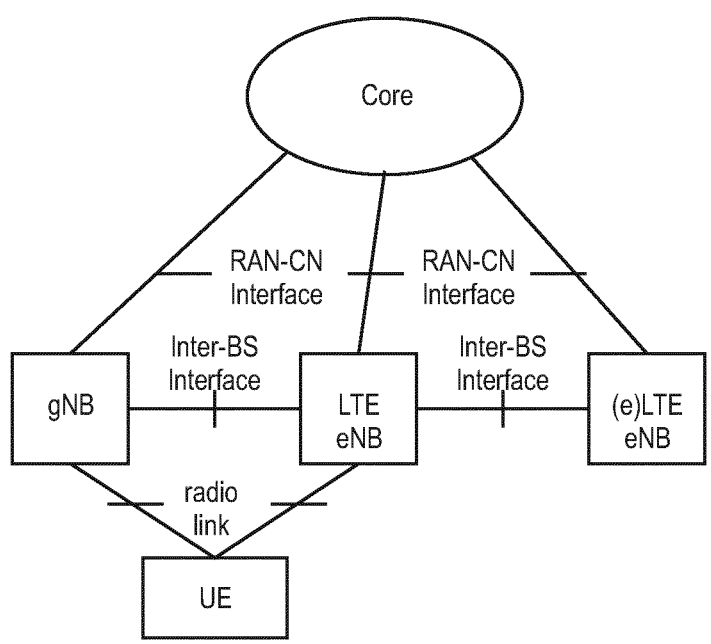
FIG. 2 shows an exemplary user and control plane architecture for the LTE eNB, gNB, and UE.

Various different deployment scenarios can be supported (see, e.g., 3GPP TR 38.801 v14.0.0). For instance, a non-centralized deployment scenario (see, e.g., section 5.2 of TR 38.801; a centralized deployment is illustrated in section 5.4) is presented therein, where base stations supporting the 5G NR can be deployed. FIG. 2 illustrates an exemplary non-centralized deployment scenario (see, e.g., FIG. 5.2.-1 of said TR 38.801), while additionally illustrating an LTE eNB as well as a user equipment (UE) that is connected to both a gNB and an LTE eNB. The new eNB for NR 5G may be exemplarily called gNB. An eLTE eNB is the evolution of an eNB that supports connectivity to the EPC (Evolved Packet Core) and the NGC (Next Generation Core).

The user plane protocol stack for NR (see, e.g., 3GPP TS 38.300, section 4.4.1) comprises the PDCP (Packet Data Convergence Protocol, see section 6.4 of TS 38.300), RLC (Radio Link Control, see section 6.3 of TS 38.300) and MAC (Medium Access Control, see section 6.2 of TS 38.300) sublayers, which are terminated in the gNB on the network side. Additionally, a new access stratum (AS) sublayer (SDAP, Service Data Adaptation Protocol) is introduced above PDCP (see, e.g., sub-clause 6.5 of 3GPP TS 38.300). A control plane protocol stack is also defined for NR (see for instance TS 38.300, section 4.4.2). An overview of the Layer 2 functions is given in sub-clause 6 of TS 38.300. The functions of the PDCP, RLC and MAC sublayers are listed respectively in sections 6.4, 6.3, and 6.2 of TS 38.300. The functions of the RRC layer are listed in sub-clause 7 of TS 38.300.

For instance, the Medium-Access-Control layer handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. It also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. One physical channel is the PRACH (Physical Random Access Channel) used for the random access.

Use cases/deployment scenarios for NR could include enhanced mobile broadband (eMBB), ultra-reliable low-latency communications (URLLC), massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability (1-10$^{-5}$ within 1 ms). Finally, mMTC may preferably require high connection density (1,000,000 devices/km$^2$ in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacing of 15 kHz, 30 kHz, 60 kHz . . . are being considered at the moment. The symbol duration $T_u$ and the subcarrier spacing $\Delta f$ are directly related through the formula $\Delta f=1/T_u$. In a similar manner as in LTE systems, the term "resource element" can be used to denote a minimum resource unit being composed of one subcarrier for the length of one OFDM/SC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain (see 3GPP TS 38.211 v15.6.0).

5G NR Functional Split Between NG-RAN and 5GC

Figure 3:
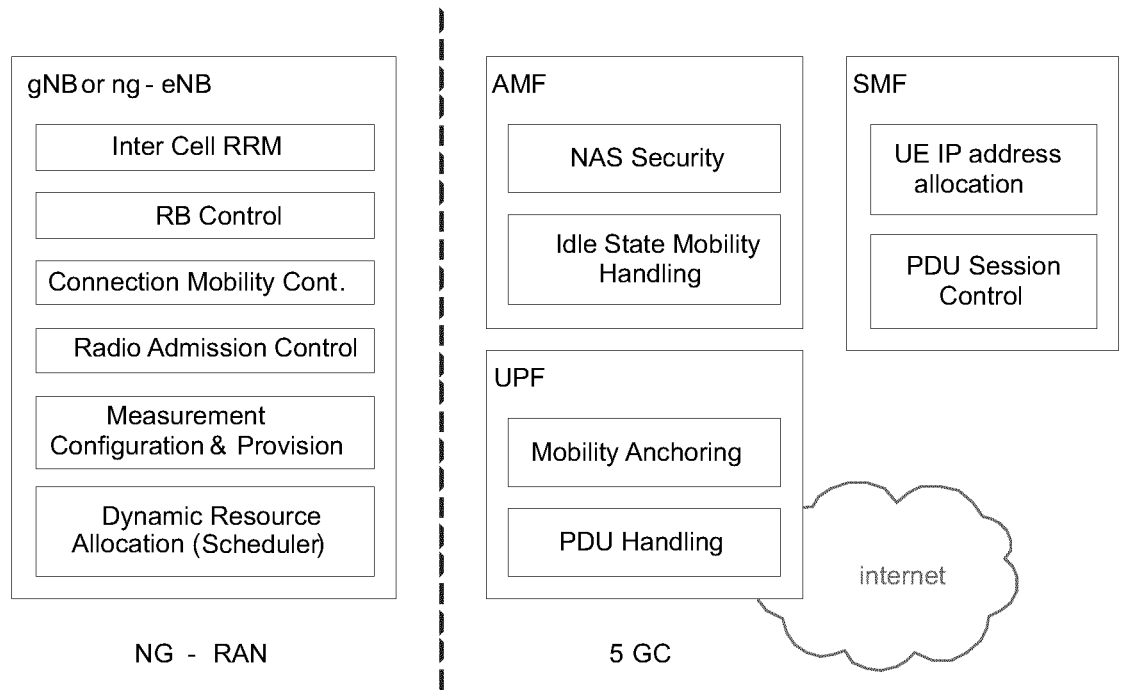
FIG. 3 is a schematic drawing that shows a functional split between NG-RAN and 5GC.

FIG. 3 illustrates functional split between NG-RAN and 5GC. NG-RAN logical node is a gNB or ng-eNB. The 5GC has logical nodes AMF, UPF and SMF.

In particular, the gNB and ng-eNB host the following main functions:
  Functions for Radio Resource Management such as Radio Bearer Control, Radio Admission Control, Connection Mobility Control, Dynamic allocation of resources to UEs in both uplink and downlink (scheduling);
  IP header compression, encryption and integrity protection of data;
  Selection of an AMF at UE attachment when no routing to an AMF can be determined from the information provided by the UE;
  Routing of User Plane data towards UPF(s);
  Routing of Control Plane information towards AMF;
  Connection setup and release;
  Scheduling and transmission of paging messages;
  Scheduling and transmission of system broadcast information (originated from the AMF or OAM);
  Measurement and measurement reporting configuration for mobility and scheduling;
  Transport level packet marking in the uplink;
  Session Management;
  Support of Network Slicing;
  QoS Flow management and mapping to data radio bearers;
  Support of UEs in RRC_INACTIVE state;
  Distribution function for NAS messages;
  Radio access network sharing;
  Dual Connectivity;
  Tight interworking between NR and E-UTRA.

The Access and Mobility Management Function (AMF) hosts the following main functions:
  Non-Access Stratum, NAS, signaling termination;
  NAS signaling security;
  Access Stratum, AS, Security control;
  Inter Core Network, CN, node signaling for mobility between 3GPP access networks;
  Idle mode UE Reachability (including control and execution of paging retransmission);
  Registration Area management;
  Support of intra-system and inter-system mobility;
  Access Authentication;
  Access Authorization including check of roaming rights;
  Mobility management control (subscription and policies);
  Support of Network Slicing;
  Session Management Function, SMF, selection.

Furthermore, the User Plane Function, UPF, hosts the following main functions:
  Anchor point for Intra-/Inter-RAT mobility (when applicable);
  External PDU session point of interconnect to Data Network;
  Packet routing & forwarding;
  Packet inspection and User plane part of Policy rule enforcement;
  Traffic usage reporting;
  Uplink classifier to support routing traffic flows to a data network;
  Branching point to support multi-homed PDU session;
  QoS handling for user plane, e.g., packet filtering, gating, UL/DL rate enforcement;
  Uplink Traffic verification (SDF to QoS flow mapping);
  Downlink packet buffering and downlink data notification triggering.

Finally, the Session Management function, SMF, hosts the following main functions:
  Session Management;
  UE IP address allocation and management;
  Selection and control of UP function;
  Configures traffic steering at User Plane Function, UPF, to route traffic to proper destination;
  Control part of policy enforcement and QoS;
  Downlink Data Notification.

RRC Connection Setup and Reconfiguration Procedures

Figure 4:
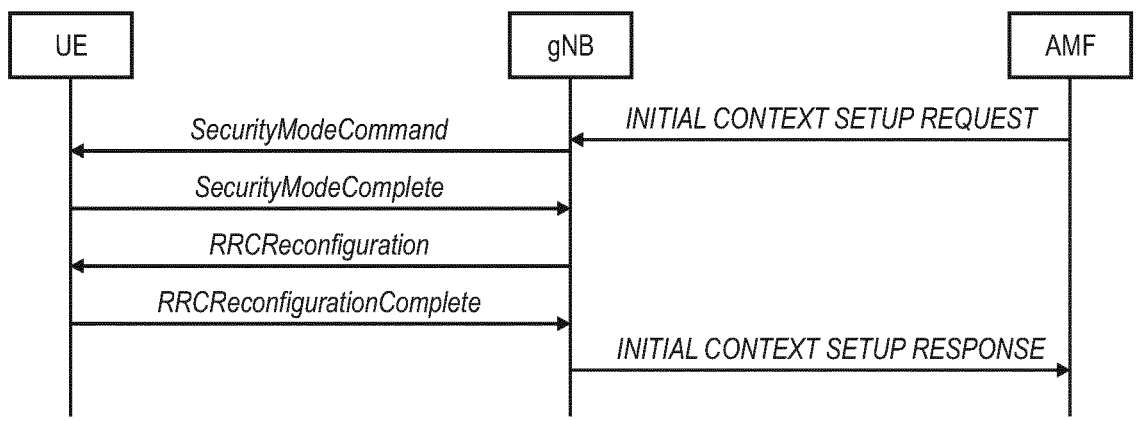
FIG. 4 is a sequence diagram for RRC connection setup/reconfiguration procedures.

FIG. 4 illustrates some interactions between a UE, gNB, and AMF (a 5GC entity) in the context of a transition of the UE from RRC_IDLE to RRC_CONNECTED for the NAS part (see TS 38.300 v15.6.0).

RRC is a higher layer signaling (protocol) used for UE and gNB configuration. In particular, this transition involves that the AMF prepares the UE context data (including, e.g., PDU session context, the Security Key, UE Radio Capability and UE Security Capabilities, etc.) and sends it to the gNB with the INITIAL CONTEXT SETUP REQUEST. Then, the gNB activates the AS security with the UE, which is performed by the gNB transmitting to the UE a SecurityModeCommand message and by the UE responding to the gNB with the SecurityModeComplete message. Afterwards, the gNB performs the reconfiguration to setup the Signaling Radio Bearer 2, SRB2, and Data Radio Bearer(s), DRB(s) by means of transmitting to the UE the RRCReconfiguration message and, in response, receiving by the gNB the RRCReconfigurationComplete from the UE. For a signaling-only connection, the steps relating to the RRCReconfiguration are skipped since SRB2 and DRBs are not setup. Finally, the gNB informs the AMF that the setup procedure is completed with the INITIAL CONTEXT SETUP RESPONSE.

In the present disclosure, thus, an entity (for example AMF, SMF, etc.) of a 5th Generation Core (5GC) is provided that comprises control circuitry which, in operation, establishes a Next Generation (NG) connection with a gNodeB, and a transmitter which, in operation, transmits an initial context setup message, via the NG connection, to the gNodeB to cause a signaling radio bearer setup between the gNodeB and a user equipment (UE). In particular, the gNodeB transmits a Radio Resource Control, RRC, signaling containing a resource allocation configuration information element to the UE via the signaling radio bearer. The UE then performs an uplink transmission or a downlink reception based on the resource allocation configuration.

Usage Scenarios of IMT for 2020 and Beyond

FIG. 5 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications. FIG. 5 illustrates some examples of envisioned usage scenarios for IMT for 2020 and beyond.

The URLLC use case has stringent requirements for capabilities such as throughput, latency and availability and has been envisioned as one of the enablers for future vertical applications such as wireless control of industrial manufacturing or production processes, remote medical surgery, distribution automation in a smart grid, transportation safety, etc. Ultra-reliability for URLLC is to be supported by identifying the techniques to meet the requirements set by TR 38.913. For NR URLLC in Release 15, key requirements include a target user plane latency of 0.5 ms for UL (uplink) and 0.5 ms for DL (downlink). The general URLLC requirement for one transmission of a packet is a BLER (block error rate) of 1E-5 for a packet size of 32 bytes with a user plane latency of 1 ms.

From RANI perspective, reliability can be improved in a number of possible ways. The current scope for improving the reliability involves defining separate CQI tables for URLLC, more compact DCI formats, repetition of PDCCH, etc. However, the scope may widen for achieving ultra-reliability as the NR becomes more stable and developed (for NR URLLC key requirements). Particular use cases of NR URLCC in Rel. 15 include Augmented Reality/Virtual Reality (AR/VR), e-health, e-safety, and mission-critical applications.

Moreover, technology enhancements targeted by NR URLCC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLCC) may be pre-empted by a transmission for a service type B (such as eMBB). Technology enhancements with respect to reliability improvement include dedicated CQI/MCS tables for the target BLER of 1E-5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, and especially necessary for URLLC and mMTC, is high reliability or ultra-reliability. Several mechanisms can be considered to improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability in general, regardless of particular communication scenarios.

For NR URLLC, further use cases with tighter requirements have been identified such as factory automation, transport industry and electrical power distribution, including factory automation, transport industry, and electrical power distribution. The tighter requirements are higher reliability (up to 10-6 level), higher availability, packet sizes of up to 256 bytes, time synchronization down to the order of a few µs where the value can be one or a few µs depending on frequency range and short latency in the order of 0.5 to 1 ms in particular a target user plane latency of 0.5 ms, depending on the use cases.

Moreover, for NR URLLC, several technology enhancements from RANI perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements have been identified. The term "mini-slot" refers to a Transmission Time Interval (TTI) including a smaller number of symbols than a slot (a slot comprising fourteen symbols).

QoS Control

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU Sessions. For each UE, the NG-RAN establishes at least one Data Radio Bearers (DRB) together with the PDU Session, and additional DRB(s) for QoS flow(s) of that PDU session can be subsequently configured (it is up to NG-RAN when to do so), e.g., as shown above with reference to FIG. 4. The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

FIG. 6 illustrates a 5G NR non-roaming reference architecture (see TS 23.501 v16.1.0, section 4.23). An Application Function (AF), e.g., an external application server hosting 5G services, exemplarily described in FIG. 5, interacts with the 3GPP Core Network in order to provide services, for example to support application influence on traffic routing, accessing Network Exposure Function (NEF) or interacting with the Policy framework for policy control (see Policy Control Function, PCF), e.g., QoS control. Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

FIG. 6 shows further functional units of the 5G architecture, namely Network Slice Selection Function (NSSF), Network Repository Function (NRF), Unified Data Management (UDM), Authentication Server Function (AUSF), Access and Mobility Management Function (AMF), Session Management Function (SMF), and Data Network (DN), e.g., operator services, Internet access or 3rd party services.

Random Access Procedure

Similar to LTE, 5G NR provides a RACH (Random Access Channel) procedure (or simply random access procedure). For instance, the RACH procedure can be used by the UE to access a cell it has found. The RACH procedure can also be used in other contexts within NR, for example:

For handover, when synchronization is to be established to a new cell;

To reestablish uplink synchronization to the current cell if synchronization has been lost due to a too long period without any uplink transmission from the device;

To request uplink scheduling if no dedicated scheduling request resource has been configured for the device.

There are numerous events that may trigger the UE to perform a random access procedure such as (see 3GPP TS 38.300, v15.6.0 section 9.2.6).

The RACH procedure will be described in the following in more detail, with reference to FIGS. 7 and 8. A mobile terminal can be scheduled for uplink transmission, if its uplink transmission is time synchronized. Therefore, the Random Access Channel (RACH) procedure plays a role as an interface between non-synchronized mobile terminals (UEs) and the orthogonal transmission of the uplink radio access. For instance, the Random Access is used to achieve uplink time synchronization for a user equipment, which either has not yet acquired, or has lost, its uplink synchronization. Once a user equipment has achieved uplink synchronization, the base station can schedule uplink transmission resources for it. One scenario relevant for random access is where a user equipment in RRC_CONNECTED state, handing over from its current serving cell to a new target cell, performs the Random Access Procedure in order to achieve uplink time-synchronization in the target cell.

There can be two types of random access procedures allowing access to be either contention based, i.e., implying an inherent risk of collision, or contention free (non-contention based). An exemplary definition of a random access procedure can be found in 3GPP TS 38.321, v15.6.0 section 5.1.

In the following, the contention-based random access procedure is being described in more detail with respect to FIG. 7. This procedure consists of four "steps," and thus can be termed as well 4-step RACH procedure. First, the user equipment transmits a random access preamble on the Physical Random Access Channel (PRACH) to the base station (i.e., message 1 of the RACH procedure). After the base station has detected a RACH preamble, it sends a Random Access Response (RAR) message (message 2 of the RACH procedure) on the PDSCH (Physical Downlink Shared Channel) addressed on the PDCCH with the (Random Access) RA-RNTI identifying the time-frequency and slot in which the preamble was detected. If multiple user equipment transmitted the same RACH preamble in the same PRACH resource, which is also referred to as collision, they would receive the same random access response message. The RAR message may convey the detected RACH preamble, a timing alignment command (TA command) for synchronization of subsequent uplink transmissions based on the timing of the received preamble, an initial uplink resource assignment (grant) for the transmission of the first scheduled transmission and an assignment of a Temporary Cell Radio Network Temporary Identifier (T-CRNTI). This T-CRNTI is used by the base station to address the mobile(s) whose RACH preamble was detected until the RACH procedure is finished, since the "real" identity of the mobile at this point is not yet known by the base station.

The user equipment monitors the PDCCH for reception of the random access response message within a given time window (e.g., termed RAR reception window), which can be configured by the base station. In response to the RAR message received from the base station, the user equipment transmits the first scheduled uplink transmission on the radio resources assigned by the grant within the random access response. This scheduled uplink transmission conveys the actual message with certain functionality such as the RRC Connection Request, RRC Resume Request or the buffer status report.

In case of a preamble collision having occurred in the first message of the RACH procedure, i.e., multiple user equipment have sent the same preamble on the same PRACH resource, the colliding user equipment will receive the same T-CRNTI within the random access response and will also collide in the same uplink resources when transmitting their scheduled transmission in the third step of the RACH procedure. In case the scheduled transmission from one user equipment is successfully decoded by base station, the contention remains unsolved for the other user equipment(s). For resolution of this type of contention, the base station sends a contention resolution message (a fourth message) addressed to the C-RNTI or Temporary C-RNTI. This concludes the procedure.

FIG. 8 is illustrating the contention-free random access procedure, which is simplified in comparison to the contention-based random access procedure. The base station provides in a first step the user equipment with the dedicated preamble to use for random access so that there is no risk of collisions, i.e., multiple user equipments transmitting the same preamble. Accordingly, the user equipment is subsequently sending the preamble that was signaled by the base station in the uplink on a PRACH resource. Since the case that multiple UEs are sending the same preamble is avoided for a contention-free random access, essentially, a contention-free random access procedure is finished after having successfully received the random access response by the UE.

3GPP is also studying a 2-step (contention-based) RACH procedure for 5G NR, where a message 1 (can also be termed msgA), that corresponds to messages 1 and 3 in the four-step LTE RACH procedure, is transmitted at first. Then, the gNB will respond with a message 2 (can also be termed msgB), corresponding to messages 2 and 4 of the LTE RACH procedure. This msgB can include, e.g., a Success random access response (RAR), a Fallback RAR, and optionally a backoff indication. Some further assumptions are made for the 2-step RACH procedure, such as that the UE, after deciding on the RACH type (e.g., the 2-step RACH), keeps retrying that same RACH type until failure. But there may be also the possibility that the UE can fallback to the 4-step RACH procedure after a certain time.

Moreover, the network may semi-statically determine radio resources, to be used for performing the 2-step RACH procedure and the 4-step RACH procedure, that are exclusive from one another. The radio resources used for transmitting the first message in the RACH procedure include at least the RACH occasion as well as the preambles. For instance, in the 2-step RACH procedure, the first message msgA uses not only the PRACH resource (e.g., the RACH occasion and preamble) but also the associated PUSCH resources.

One of the main purposes of the random access procedure is to obtain the timing advance value that is to be used by the UE to time the uplink transmissions to the base station. Uplink orthogonality is maintained by ensuring that the transmissions from different user equipments in a cell are time-aligned at the receiver of the bae station. This avoids intra-cell interference occurring, both between user equipments assigned to transmit in consecutive sub-frames and between user equipments transmitting on adjacent subcarriers. Time alignment of the uplink transmissions is achieved by applying a timing advance at the user equipment's transmitter, relative to the received downlink timing as exemplified in FIGS. 9 and 10. The main role of this is to counteract differing propagation delays between different user equipments in the cell.

Figure 9:
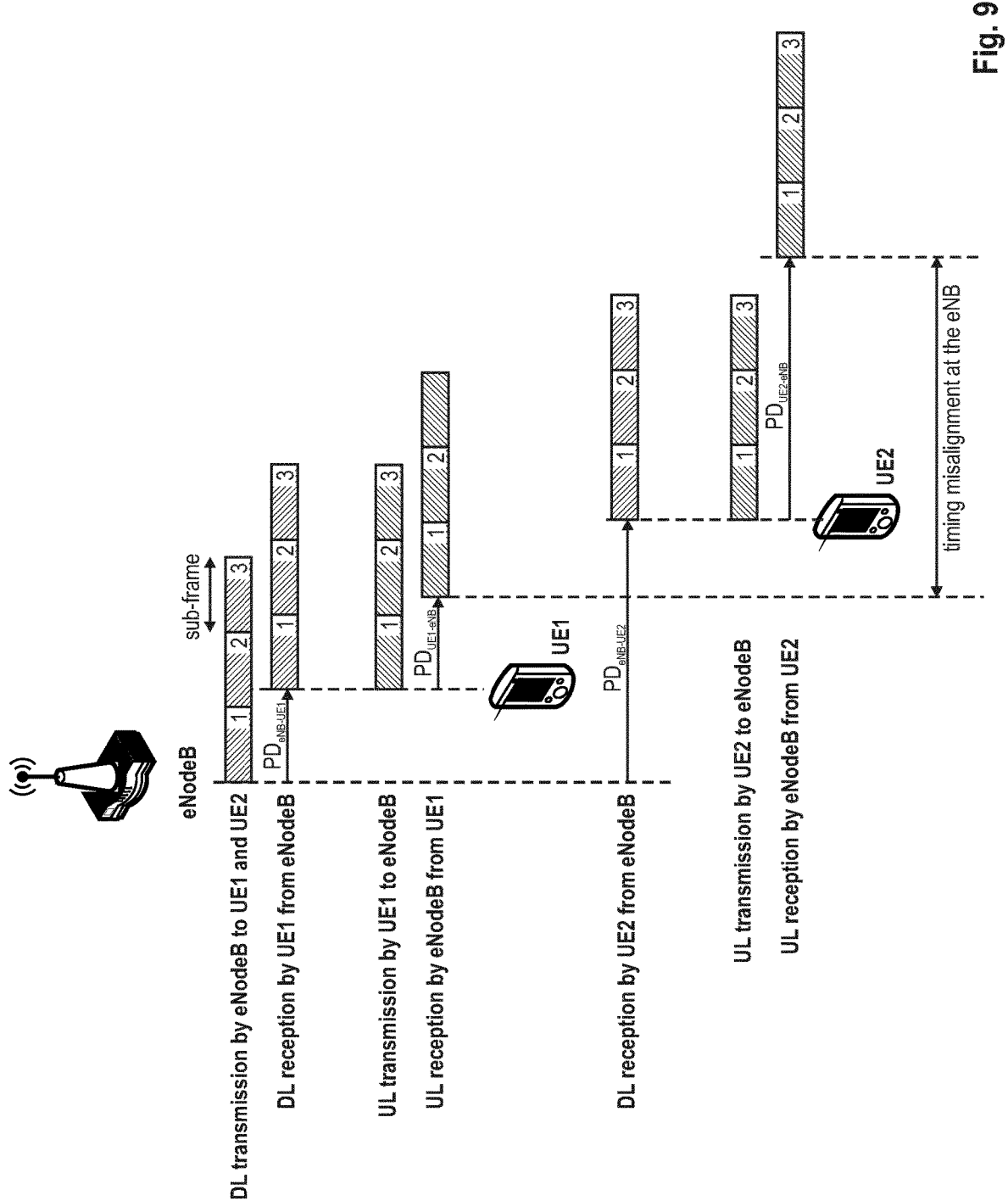
FIG. 9 illustrates the timing misalignment of uplink transmissions from two mobile terminals as received in the base station, when no uplink timing alignment is performed.

FIG. 9 exemplarily illustrates the misalignment of the uplink transmissions from two UEs in case no uplink timing alignments is performed, such that the base station (here exemplarily assumed to be an eNodeB) receives the respective uplink transmissions from the two UEs at different timings. The propagation delays PD_eNB-UE1 and PD_UE1-eNB for UE1 and the propagation delays PD_eNB-UE2 and PD_UE2-eNB for UE2 are significantly different from one another, which causes that the uplink transmissions by UE1 and UE2 are received at a different time by the eNodeB.

Figure 10:
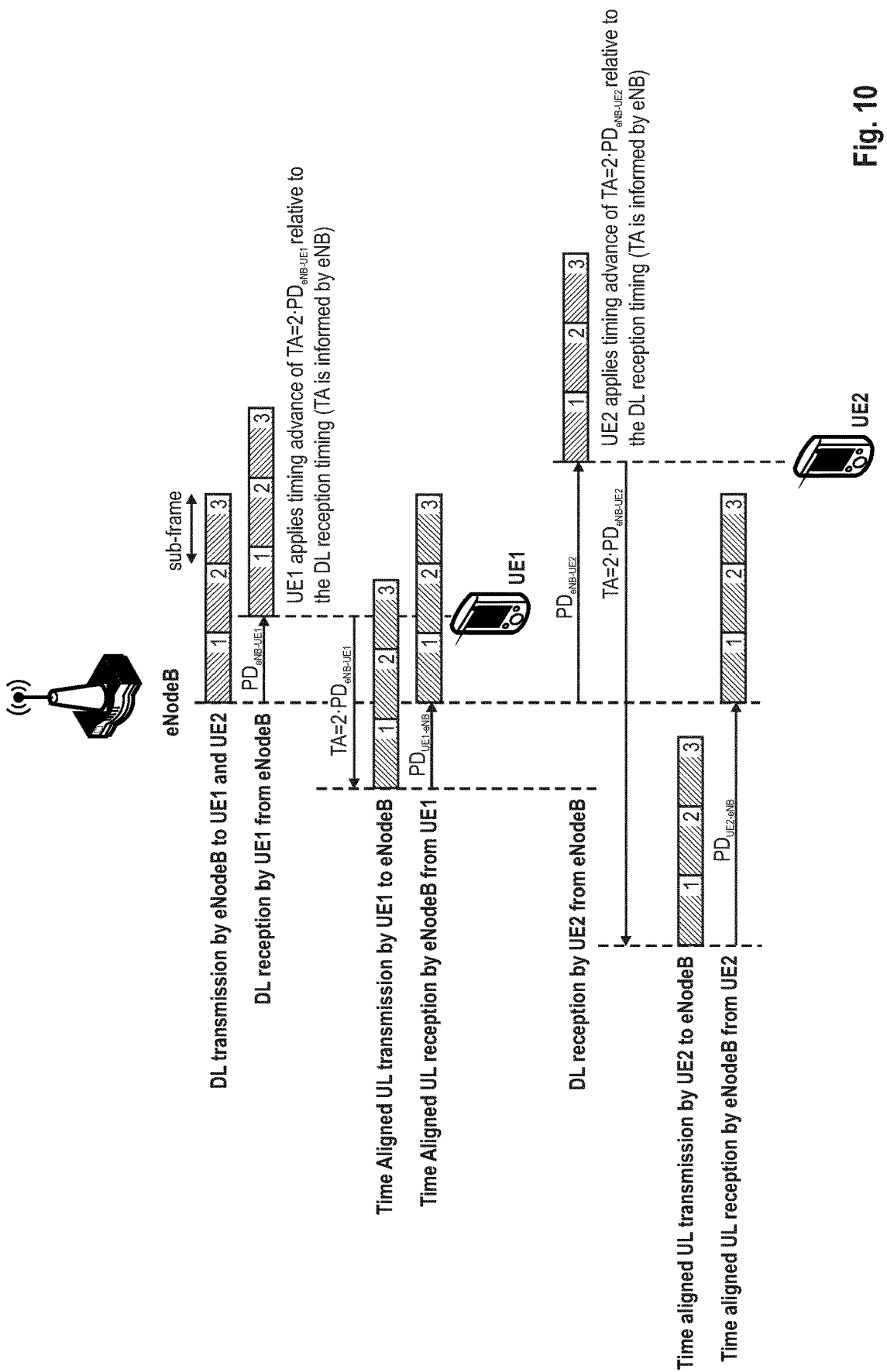
FIG. 10 illustrates the effect of performing uplink timing transmissions where the uplink timing alignment is synchronized for the uplink transmissions from two mobile terminals.

FIG. 10 in contrast thereto illustrates synchronized uplink transmissions for two UEs. The uplink timing alignment (TA) is performed by each UE and applied to the uplink transmissions such that at the base station the uplink transmissions from the two UEs arrive at substantially the same timing.

The user-equipment-specific timing advance determines therefore the uplink transmission timing from user equipment point of view. The reference for the timing advance is the downlink-subframe boundary timing as seen from the user equipment point of view as shown in FIG. 10.

The transmission timing adjustment for uplink transmissions is described in detail in 3GPP TS 38.213, version 15.6.0, section 4.2 and TS 38.321, version 15.6.0, section 5.2.

The Timing Advance Command MAC CE is identified by a MAC subheader with LCID as specified in Table 6.2.1-1 of TS 38.321. It has a fixed size and consists of a single octet defined as follows:
  TAG Identity (Timing Advance Group ID): This field indicates the TAG Identity of the addressed TAG. The TAG containing the SpCell has the TAG Identity 0. The length of the field is 2 bits;
  Timing Advance Command: This field indicates the index value TA (0, 1, 2 . . . 63) used to control the amount of timing adjustment that MAC entity has to. The length of the field is 6 bits

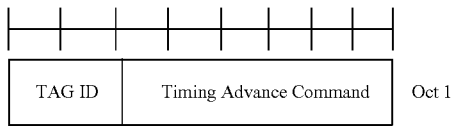

During the random access procedure, when no uplink time alignment has been performed, the UE transmits the preamble according to the DL synchronized timing. The base station then replies with the timing advance value in the RAR message, where the timing advance value is, e.g., 2×PD (assuming that $P_D=P_U$) ($P_D$ being the downlink propagation time, and $P_U$ being the uplink propagation time). The UE is to apply the received timing advance value for performing uplink transmissions.

Non-Terrestrial Networks, NTN

Satellites will continue to be the most effective means for reaching areas beyond terrestrial coverage as well as to passengers in trains, aircrafts & vessels. Therefore, including satellites as an integral part of the 5G ecosystem adds resilience. The satellite industry has participated in various committees, including in 3GPP, EC and ITU-T to ensure that satellite systems are integrated as an intrinsic part of the 5G ecosystem. The targets are 1) to support highly available and reliable connectivity using satellites for use cases such as ubiquitous coverage, disaster relief, public safety requirements, emergency response, remote sensor connectivity, broadcast service, etc., 2) to support an air-interface with one-way latency of up to 275 ms when satellite connection is involved, and 3) to support seamless mobility between terrestrial and satellite-based networks with widely varying latencies. The roles and benefits of satellites in 5G have been studied in 3GPP Release 14, leading to the specific requirement to support satellite access.

Figure 11:
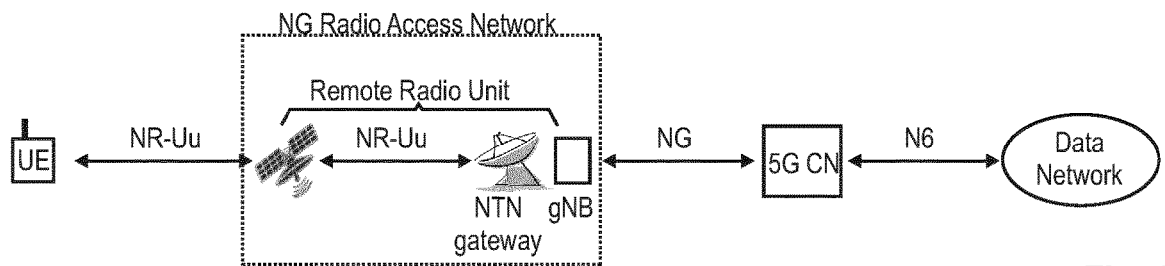
FIG. 11 illustrates an exemplary NG RAN architecture based on a transparent satellite.

FIG. 11 illustrates an exemplary NG RAN architecture based on a transparent satellite. According to one exemplary implementation (see TR 38.821 v0.3.0 section 5.1), the satellite payload implements frequency conversion and a Radio Frequency amplifier in both uplink and downlink direction. It corresponds to an analogue RF repeater. Hence, the satellite repeats the NR-Uu radio interface from the feeder link (between the NTN gateway and the satellite) to the service link (between the satellite and the UE) and vice versa. The Satellite Radio Interface (SRI) on the feeder link is the NR-Uu. In other words, the satellite does not terminate NR-Uu.

Figure 12:
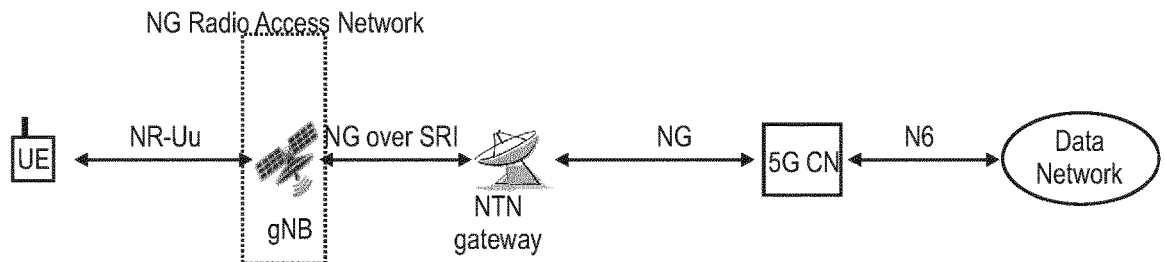
FIG. 12 illustrates an exemplary NG RAN architecture based on a regenerative satellite.

FIG. 12 illustrates an exemplary NG RAN architecture based on a regenerative satellite. According to one exemplary implementation (see TR 38.821 v0.3.0 section 5.2), the NG-RAN logical architecture as described in TS 38.401 is used as baseline for NTN scenarios. The satellite payload implements regeneration of the signals received from Earth. The NR-Uu radio interface is on the service link between the UE and the satellite. The Satellite Radio Interface (SRI) is on the feeder link between the NTN gateway and the satellite. SRI (Satellite Radio Interface) is a transport link between NTN GW and satellite. The satellite payload also provides Inter-Satellite Links (ISL) between satellites. ISL (Inter-Satellite Links) is a transport link between satellites.

Timing Advance for NTN

To support the long delay in NTN scenario, it is possible to indicate the complete timing advance based on two components, the common timing advance value and an individual (i.e., UE-specific) timing advance value. Together, the common TA value and the individual TA value compose the total TA value. The common TA is used to compensate the round trip delay (RTD) at a reference point location within the radio cell/beam, e.g., at a nearest point of the cell, and could be determined to be two times the transmission delay between the satellite and the reference point. On the other hand, the individual TA is used to control the timing per UE, and varies, e.g., based on the location of the specific UE.

Figure 13:
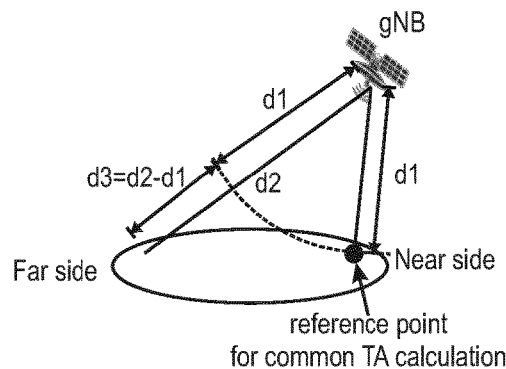
FIG. 13 illustrates a regenerative satellite scenario with the corresponding propagation delays and the reference point for calculating the common TA.
Figure 14:
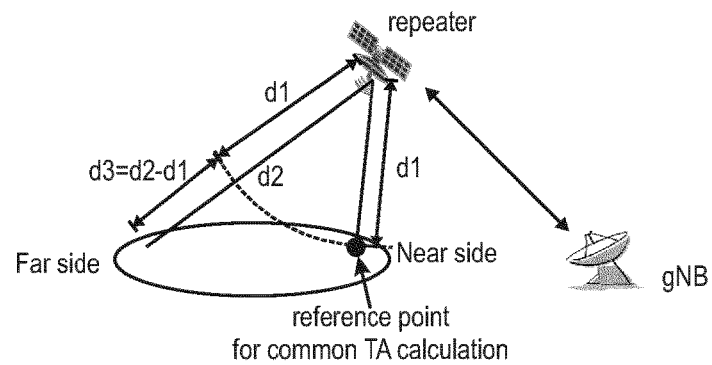
FIG. 14 illustrates a transparent satellite scenario with the corresponding propagation delays and the reference point for calculating the common TA.

Two different satellites scenarios are presented in FIGS. 13 and 14, a regenerative satellite deployment in FIG. 13 and a transparent satellite deployment in FIG. 14. A delay corresponding to the indicated delay d1 can be compensated by the common TA value, being calculated at the illustrated reference point. On the other hand, for a different position in the cell (with a total delay of d2), the differential delay corresponding to d3 (d3=d2−d1) could be additionally compensated by the individual TA. The common TA value would thus be identical to the total TA value when the UE is located at the reference point.

It is exemplarily assumed that the gNB responds with the individual TA in the random access response message during the RACH procedure. The common TA value can be, e.g., broadcast in system information in the radio cell. Thus, the UE obtained for both parameters and can determine the total TA value.

Correspondingly, the UE can use the common TA when sending the random access preamble, and then obtains the individual TA in the RAR. Without applying the common TA when transmitting the RACH preamble, the Guard Period (GP) in the PRACH transmission would have to be long enough to accommodate the NTN RTD, which is quite long, and thus might not be easily possible. This is different from non-NTN scenarios in which the UE, when performing a RACH procedure, does typically not apply any timing advance when transmitting the RACH preamble but rather follows the downlink timing.

In addition, the common TA can be indicated per radio cell or per beam. In the following, it is exemplarily assumed that the common TA is valid for the whole cell. However, when the common TA value is per beam of a radio cell, then multiple common TA values can be provided, each corresponding to one of the multiple beams. The UE would then, e.g., select one of the beam-specific common TA values based on the SSB selection (Synchronization Signal Block selection).

As a further example implementation, the common TA is to be understood as a parameter that may be signaled as a time offset value to compensate for the RTT (Round Trip Time). It can be also used for other purposes (e.g., may not be exactly the same form as "common TA") and might also be termed differently.

Handover Procedure

Figure 15:
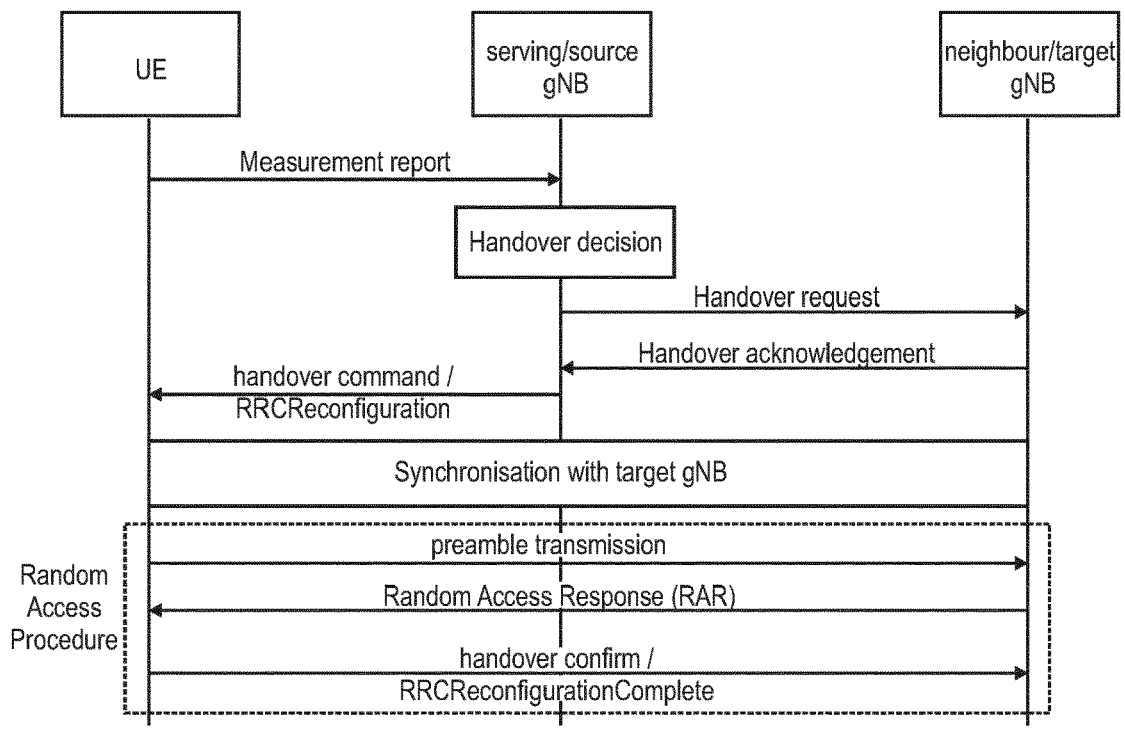
FIG. 15 illustrates the signaling exchange for a legacy handover procedure.

A typical and simplified handover is illustrated in FIG. 15 and explained briefly in the following. A handover of the UE involves that the source base station takes the decision whether to hand over the UE or not to a neighboring radio cell. A decision to handover a UE from a source cell to a target cell is typically taken by the source gNB, e.g., based on measurement results from the UE (carried in one or more measurement reports).

The handover is then prepared (preparation phase) between the two involved base stations, source and target base station, by the source gNB transmitting a handover request message to the target base station and the target gNB responding with a Handover request acknowledgement message. In the execution phase, the UE is then instructed through a handover command message (RRCReconfiguration message) to switch from the source cell to the target cell, which, e.g., involves reconfiguration the UE's radio resources so as to establish a connection with the target base station of the target radio cell. The UE accordingly performs the reconfiguration and attaches to the new target base station, which comprises a synchronization and performing a (e.g., contention-free) random access procedure. For instance, the synchronization may comprise that the UE acquires the synchronization signals (e.g., Primary Synchronization Signal, PSS, and Secondary Synchronization Signal, SSS) typically used to obtain the cell identity and frame timing of the target cell, thereby achieving time and frequency synchronization. The random access procedure is performed by the UE, e.g., in order to acquire the timing advance value and to obtain uplink resources for uplink transmission with the RAR message. It consists at least in transmitting the RACH preamble (in line with what the preamble indicated in the handover command message for a contention-free RACH), the reception of the Random Access Response (e.g., including an uplink grant), and finally as the third and last step of the random access procedure, the UE confirms that is has completed the reconfiguration and access to the target cell by transmitting a handover confirm message (RRCReconfigurationComplete message) to the target gNB.

An exemplary implementation of such a handover procedure is defined for 5G NR in the 3GPP Technical Standard TS 38.300, section 9.2.3.

RACH-Less Handover for NTN

There is an ongoing discussion for enhancing mobility for NTN. The inventors have recognized that for non-terrestrial communication, the round trip delay (RTD) can be much larger than in terrestrial communication. For instance, the maximum RTD in NTN is 541.1 ms for GEO (Geostationary Earth Orbiting, e.g., at 35786 km altitude) and 25.76/41.76 ms for LEO (Low Earth Orbiting, e.g., at 600/1200 km altitude). In terrestrial communication the RTD can be, e.g., up to 5 ms.

A long RTD can result in a large handover latency. Therefore, there is a need for specific solutions to minimize or reduce latency during handovers for a mobile UE, specifically for real-time applications.

One potential solution is a RACH-less handover as will be explained in the following.

One exemplary assumption for the RACH-less handover procedure is that the source cell and the target cell are time-synchronized, such that the subframe boundaries between the source cell and the target cell are aligned. For instance, according to the most stringent time synchronization, the subframe boundaries are synchronized up to the symbol timing, e.g., following the same system frame number, same slot number and same symbol number. But also a less stringent time synchronization is possible, such as up to the same system frame number or up to the same slot number.

The RACH-less handover can be, e.g., similar to the legacy handover, explained above in connection with FIG. 15, but with some important differences as will be explained with reference to FIG. 16.

To begin with, the UE needs to be aware whether to perform a RACH-less handover or another type of handover (such as the legacy handover procedure of FIG. 15). One possibility is to configure the UE accordingly to perform the RACH-less handover; e.g., the source base station can provide the corresponding configuration information to the UE. Another possibility is that the handover command message provides the corresponding indication to the UE whether to perform the RACH-less handover procedure (or not, e.g., a legacy handover, involving the random access procedure). For instance, in order to coordinate the uplink transmission of the handover confirm message to the target base station, the handover command message may include an indication of uplink resources to be used by the UE to transmit the handover confirm message. This resource indication is not necessary for the legacy handover procedure, because a suitable UL grant is typically carried by the Random Access Response message of the RACH procedure. Thus, when the UE determines that the handover command message includes an UL grant, it may determine that the source base station instructs the UE to perform a RACH-less handover; otherwise, if the UL grant is not present in the handover command message, the UE determines that it shall perform another type of handover, such as the legacy handover procedure of FIG. 15. Alternatively or additionally, the handover command message may simply include one or more bits encoding which type of handover procedure the UE has to perform.

The UL grant of the handover command message can be understood as indicating a particular time (e.g., a particular SFN) that can be mutually agreed between the source and target base station. For instance, the target base station provides the UL grant information in the handover acknowledgement message to the source gNB.

After receiving the command to handover to the target cell, the UE may proceed to synchronize with the target gNB. On the other hand, when assuming that the source and target gNB are (fully) synchronized, the UE might not even have to acquire the PSS and SSS for time and frequency synchronization. Furthermore, the UE does not initiate the usual RACH procedure, thus not transmitting the random access preamble. Correspondingly, the UE is not required to perform a random access procedure (or at least to perform the full random access procedure).

Instead, at the above-mentioned mutually agreed time, the UE is to hand over from the source radio cell to the target radio cell. The RACH procedure is thus not initiated, and the handover procedure proceeds with the UE confirming the handover to the target cell, by transmitting the handover confirm message using the UL resources indicated in the handover command message.

Eliminating the RACH delay during a handover procedure can significantly reduce the data interruption during handovers and improve the user experience, which is particularly important in the assumed NTN scenarios with the long RTD.

However, one of the main purposes of the RACH procedure during the handover is to adapt the uplink timing with the target by performing the random access procedure and acquiring the target cell timing advance value (target cell TA value) to be used by the UE for uplink transmissions in the target cell. But in the absence of the RACH procedure, the UE would not obtain the timing advance value in the RAR message. The UE would thus have to determine the target cell TA value in a different manner.

According to one possible solution, the UE can estimate the required TA value of the gNB, based on the satellite ephemeris and UE location. For instance, the UE would have to estimate the target cell TA value before sending the RRCReconfigurationComplete message to the target cell, so as to ensure that the message can be correctly received at the target node. The UE first observes the DL propagation delay difference between the source cell and the target cell, e.g., T2–T1 (or T1–T2), where T1 is the DL propagation delay between the UE and the source gNB, and T2 is the DL propagation delay between the UE and the target gNB. Further, it is assumed that the UL propagation delay is the same as the DL propagation delay. Under this assumption, the UE can derive the target cell timing advance based on the source cell timing advance as follows.

$$TA_{target}=2 \times T2$$

$$TA_{source}=2 \times T1$$

$$TA_{target}-TA_{source}==2 \times (T2-T1)$$

$$TA_{target}=TA_{source}-2 \times (T1-T2) \quad \text{(Equation 1)}$$

The inventors have however identified that there is a need for improving the time alignment and RACH-less handover procedures in general, but especially for NTN scenarios.

The above-discussed estimation of the target TA value (see Equation 1) has disadvantages when applied to a RACH-less handover procedure in NTN.

The conventional RACH-less HO with regular TA estimation may cause problems described below due the missing of a timing advance correction (e.g., common TA and individual TA). First, the UE is not able to perform RACH immediately after HO to the target cell, because the common TA of the target cell is not yet obtained. Further, the UE might not be able to fallback to use the contention-based HO if the contention-free HO is not successful, because the common TA of the target cell is still not known. Then, after finishing the handover, and upon receiving the updated common TA of the target cell (e.g., in the system information), the UE does not know how to adjust the TA while performing the UL transmission, because the individual TA is still unknown to the UE.

Moreover, the UE may not be able to observe the true DL timing difference between the source cell and target cell, because there might be "more than SFN difference" situation in NTN due to the large RTD. For instance, if the synchronization signal from the source cell is from SFN n while the synchronization signal from the target cell is from SFN n–1, and these two synchronization signals arrive at UE quite closely. Then, UE will consider the DL timing difference between these two cells are very small, even though the actual DL timing difference is already 10 ms large. This scenario is possible if the distance between the source cell and the UE is quite longer than the distance between the target cell and the UE, or the other way around.

In addition, such a solution would not be the optimized solution for the GNSS-equipped UE.

Still further, the feeder link delay and satellite processing delay in the transparent satellite scenario have to be taken into account.

And further, the assumption that the DL and UL propagation delay are the same may be erroneous. Especially in the transparent satellite case, the DL and UL propagation delays may be different, because the propagation delay also covers the feeder link delay and satellite processing delay, which can be different in the DL and UL case.

Consequently, the inventors have identified the possibility to improve the handover procedure to be performed so as to hand over a UE from a source base station to a target base station. Such an improved handover procedure may facilitate overcoming one or more of the above-identified problems.

In the following, UEs, base stations, and procedures to meet these needs will be described for the new radio access technology envisioned for the 5G mobile communication systems, but which may also be used in LTE mobile communication systems. Different implementations and variants will be explained as well. The following disclosure was facilitated by the discussions and findings as described above and may for example be based at least on part thereof.

In general, it should be noted that many assumptions have been made herein so as to be able to explain the principles underlying the present disclosure in a clear and understandable manner. These assumptions are however to be understood as merely examples made herein for illustration purposes that should not limit the scope of the disclosure. A skilled person will be aware that the principles of the following disclosure and as laid out in the claims can be applied to different scenarios and in ways that are not explicitly described herein.

Moreover, some of the terms of the procedures, entities, layers, etc., used in the following are closely related to LTE/LTE-A systems or to terminology used in the current 3GPP 5G standardization, even though specific terminology to be used in the context of the new radio access technology for the next 3GPP 5G communication systems is not fully decided yet or might finally change. Thus, terms could be changed in the future, without affecting the functioning of the embodiments. Consequently, a skilled person is aware that the embodiments and their scope of protection should not be restricted to particular terms exemplarily used herein for lack of newer or finally agreed terminology but should be more broadly understood in terms of functions and concepts that underlie the functioning and principles of the present disclosure.

For instance, a mobile station or mobile node or user terminal or user equipment (UE) is a physical entity (physical node) within a communication network. One node may have several functional entities. A functional entity refers to a software or hardware module that implements and/or offers a predetermined set of functions to other functional entities of the same or another node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "base station" or "radio base station" here refers to a physical entity within a communication network. As with the mobile station, the base station may have several functional entities. A functional entity refers to a software or hardware module that implements and/or offers a predetermined set of functions to other functional entities of the same or another node or the network. The physical entity performs some control tasks with respect to the communication device, including one or more of scheduling and configuration. It is noted that the base station functionality and the communication device functionality may be also integrated within a single device. For instance, a mobile terminal may implement also functionality of a base station for other terminals. The terminology used in LTE is eNB (or eNodeB), while the currently used terminology for 5G NR is gNB.

FIG. 17 illustrates a general, simplified and exemplary block diagram of a user equipment (also termed communication device) and a scheduling device (here exemplarily assumed to be located in the base station, e.g., the eLTE eNB (alternatively termed ng-eNB) or the gNB in 5G NR). The UE and eNB/gNB are communicating with each other over a (wireless) physical channel respectively using the transceiver.

The communication device may comprise a transceiver and processing circuitry. The transceiver in turn may comprise and/or function as a receiver and a transmitter. The processing circuitry may be one or more pieces of hardware such as one or more processors or any LSIs. Between the transceiver and the processing circuitry there is an input/output point (or node) over which the processing circuitry, when in operation, can control the transceiver, i.e., control the receiver and/or the transmitter and exchange reception/transmission data. The transceiver, as the transmitter and receiver, may include the RF (radio frequency) front including one or more antennas, amplifiers, RF modulators/demodulators and the like. The processing circuitry may implement control tasks such as controlling the transceiver to transmit user data and control data provided by the processing circuitry and/or receive user data and control data, which is further processed by the processing circuitry. The processing circuitry may also be responsible for performing other processes such as determining, deciding, calculating, measuring, etc. The transmitter may be responsible for performing the process of transmitting and other processes related thereto. The receiver may be responsible for performing the process of receiving and other processes related thereto, such as monitoring a channel.

An improved procedure on how to perform a handover procedure will be described in the following.

FIG. 18 illustrates a simplified and exemplary UE structure according to one solution of the improved handover procedure, and can be implemented based on the general UE structure explained in connection with FIG. 17. The various structural elements of the UE illustrated in said figure can be interconnected between one another, e.g., with corresponding input/output nodes (not shown), e.g., in order to exchange control and user data and other signals. Although not shown for illustration purposes, the UE may include further structural elements.

As apparent from FIG. 18, the UE may include a common timing-advance value receiver, a handover procedure circuitry, a first uplink timing determination circuitry, a second message timing indication receiver, a UE-specific timing advance value determination circuitry, and a second handover message transmitter.

In the present case as will become apparent from the below disclosure, the processing circuitry can thus be exemplarily configured to at least partly perform one or more of determining a first uplink timing of uplink transmissions to the target base station, determining a UE-specific timing advance value for the target cell, determining second uplink timings for transmitting messages of a random access procedure, and determining third uplink timings for transmitting uplink data, etc.

The receiver can thus be exemplarily configured to at least partly perform one or more of receiving a first message of a handover procedure from a source base station, including a common timing advance value and a timing indication for transmitting a second message of the handover procedure, receiving a third message of the handover procedure from the target base station, including information on the UE-specific timing advance value for the UE and target cell, etc.

The transmitter can thus be exemplarily configured to at least partly perform one or more of transmitting a second message of the handover procedure to the target base station based on a previously determined uplink transmission timing, transmitting messages of a random access procedure to the target base station at a second uplink timing, and transmitting uplink data to the target base station at a third uplink timing, etc.

One solution as will be disclosed in more detail further below is implemented by a UE that includes the following. A receiver of the UE receives, from a source base station of a source radio cell, a common timing advance value for a target radio cell. The UE is connected to the source radio cell and is involved in a handover procedure to hand over the UE from the source radio cell to the target radio cell. Further, the common timing advance value is received from the source base station in a first message of the handover procedure, which also comprises a timing indication for transmitting a second message from the UE to the target base station. Then, a processor of the UE determines a first uplink timing of uplink transmissions to the target base station with respect to downlink transmissions from the target base station, based on the received common timing advance value and the timing indication. A transmitter of the UE transmits a second message of the handover procedure to the target base station based on the determined uplink timing. The processor determines a UE-specific timing advance value, specific to the UE and the target radio cell, to be used by the UE for performing uplink transmissions in the target radio cell.

As a further example implementation, the common TA may be signaled as a time offset value to compensate for the RTT (Round Trip Time), which can be used for other purposes (e.g., may not be exactly the same form as "common TA").

Correspondingly, the UE while still being connected to the source BS already has knowledge on the common TA that it will have to use for communication in the target cell. This facilitates overcoming the above discussed problems relating to the fact that the UE does not acquire the common TA value when not reading the system information of the target base station. For instance, subsequently transmitted messages (e.g., of the handover procedure) are more likely to be correctly received by the target base station when time aligning them based on the common TA value. Since the common target TA was already obtained during the handover procedure, the UE can perform a random access procedure directly after completing the handover procedure.

Moreover, the solution involves determining the UE-specific TA value for the UE to be used at the target cell, which facilitates communication in the target cell. It also allows adjusting and updating the total TA, because the individual TA value is known.

Overall, the advantages of a RACH-less handover procedure of expediting the handover and thus significantly reducing the handover interruption time, due to the eliminated random access procedure, are maintained, while taking advantage of the obtained common TA value and the determined UE-specific TA value to align the uplink communications at the target cell, thereby keeping the handover success rate high even when not performing the RACH.

The above solution as well as variants and further improvements on the above solution will be explained in more detail below.

For the following explanations of the solutions for the improved handover procedure, some basic assumptions are exemplarily made. To begin with, an NTN scenario is assumed, where the UE is communicating via a satellite in a source radio cell, and also the neighboring radio cell as the possible target of the handover is a non-terrestrial network, such as explained above. Moreover, it is assumed that the UE supports and shall perform the handover without executing a random access procedure, e.g., shall perform a RACH-less handover, such as explained above.

An exemplary implementation of the solution is explained with reference to FIGS. 19, 20, and 21.

FIG. 19 is a sequence diagram for an exemplary UE behavior, FIG. 20 is a sequence diagram for an exemplary source base station behavior, and FIG. 21 illustrates the message exchange between the UE, the source BS and the target BS to implement the improved handover procedure. The handover procedure is improved by providing a common TA value of the target cell within a first handover message transmitted from the source base station to the UE. The common TA value is valid in the target cell to which the UE is to be handed over. For instance, the common TA value is common to all UEs in the target cell and is calculated with respect to a reference point in the target radio cell (e.g., a shortest distance to satellite or a center of radio cell). On the other hand, the UE-specific TA value (also termed individual TA value) mentioned later, is specific to just a particular UE and its location, and is to be considered in addition to the common TA value. Exemplarily, the common TA value and the individual TA value are to be understood as explained above in connection with FIGS. 13 and 14.

Moreover, the first handover message also carries a timing indication for transmitting a second handover message by the UE to the target base station and thus provides the UE with a particular time to transmit the second handover message and thus proceed with performing the handover procedure to the target base station. The timing indication can be provided in the form of an uplink grant that schedules uplink resources for the UE to be used for the transmission of the second handover message. Both the timing indication and the common TA value are used to determine the actual time the UE is to transmit the second handover message. For instance, the point in time, according to the timing indication for transmitting the second handover message, is corrected based on the common TA value so as to (at least partly) align the uplink transmission of the UE with other uplink transmission from other UEs to the target base station.

By providing the common TA value as well as the uplink transmission timing for transmitting the second handover message, the handover procedure thus facilitates that the second handover message is correctly received at the target base station.

For instance, the timing indication can be implemented the same or similar to the uplink grant provided during the random access procedure in the random access response message (see FIGS. 7 and 8).

The UE can then transmit the second handover message to the target base station at the previously determined uplink transmission timing.

Subsequent to transmitting the second handover message, the UE may determine the UE-specific TA value for the target cell in order to be able to more closely align the uplink transmission timing for subsequent uplink transmission. The UE-specific TA value is more important for the correct uplink transmission time alignment, when the UE is located far away from the reference point of calculating the common TA value. Conversely, when the UE is located at or close to the reference point of calculating the common TA value, there might not even be a need for the UE to determine the UE-specific TA value for the target cell, because the UE-specific TA value is very small or 0 and the common TA value is almost identical to the total TA value in the target cell. Thus, when the UE is, e.g., informed that it is located at or sufficiently near the reference point for calculating the common TA value in the target cell, the UE may decide to not determine the UE-specific TA value. Corresponding information may be, e.g., provided by the source base station. However, it is assumed in the following that the UE determines the UE-specific TA value so as to further improve the timing advance alignment of its uplink transmissions.

In any case, by thus determining a timing advance value (e.g., determining the common TA value as well of the UE-specific TA value), the UE can align its uplink transmission timing, thus improving the uplink transmissions during the handover procedure (using only the common TA value) and subsequent to the handover procedure (using the common TA value and possibly also the UE-specific TA value).

In more detail, the UE may perform a random access procedure with the target base station at some point after finishing the handover procedure. In order to allow the target base station to properly determine the necessary UE-specific timing advance value, the UE may transmit messages of the RACH procedure solely based on the common timing advance value, e.g., not using the previously-determined UE-specific TA value.

Moreover, the UE may use the common TA value and also the UE-specific TA value when determining uplink transmissions timings relating to transmitting uplink data to the target base station. For instance, the target base station schedules uplink radio resources to the UE, which the UE may use to transmit data in the uplink. The UE then aligns the transmission time given by the scheduled UL radio resources based on the common TA value and the UE-specific TA value.

In the above explanations the first and second handover messages are mentioned as being part of the solution presented with reference to FIGS. 19, 20, and 21. The first handover message can be considered as a handover command message that instructs the UE how to reconfigure the radio resource configuration of the UE in order to establish a connection to the target radio cell. From the perspective of the UE, the handover command message is thus the first message of the handover procedure. In an exemplary implementation of the solutions in a 5G NR standardized scenario, the handover command message could be implemented as the RRCReconfiguration message defined in the corresponding 3GPP standard TS 38.331 version 15.6.0 section 6.2.2 (see also FIG. 15 and corresponding explanations). When reusing the already defined RRCReconfiguration message, its content has to be extended so as to be able to carry the additional information on the timing indication (uplink grant) and the common TA value. For instance, the RRCReconfiguration message could be extended to carry the Timing Advance Command MAC CE as presented above, which value is then taken by the UE as the common TA value of the target cell. For instance, the value in TAC MAC CE can be placed in the secondaryCellGroup Information Element of the RRCReconfiguration message. Also the uplink grant could be placed in the secondaryCellGroup Information Element of the RRCReconfiguration message.

On the other hand, the second handover message that is transmitted from the UE to the target base station can be considered as a handover confirm message that indicates to the target base station that the establishment of the connection of the UE to the target base station is complete. In an exemplary implementation of the solutions in a 5G NR standardized scenario, the handover confirm message can be implemented as the RRCReconfigurationComplete message defined in the corresponding 3GPP standard TS 38.331. No additional changes to the already defined RRCReconfigurationComplete of the 3GPP standard seem necessary for the implementation of the handover confirm explained as part of the solutions above.

In the above, it was explained that the UE receives the common TA value of the target cell from the source cell in a handover message. The source base station in turn is able to determine the common TA value of the target cell. This can be done in several ways. According to one solution, the target base station provides its neighboring base stations with information on the common TA value it is using and broadcasting in its radio cell. For instance, the target BS can provide the common TA value when it is requested to be the target of a handover, e.g., in the handover acknowledgement message transmitted from the target base station to the source base station in response to the handover request message. According to another solution, the target base station broadcasts its common TA to its neighbor base stations periodically and proactively as part of the background information exchange.

Figure 16:
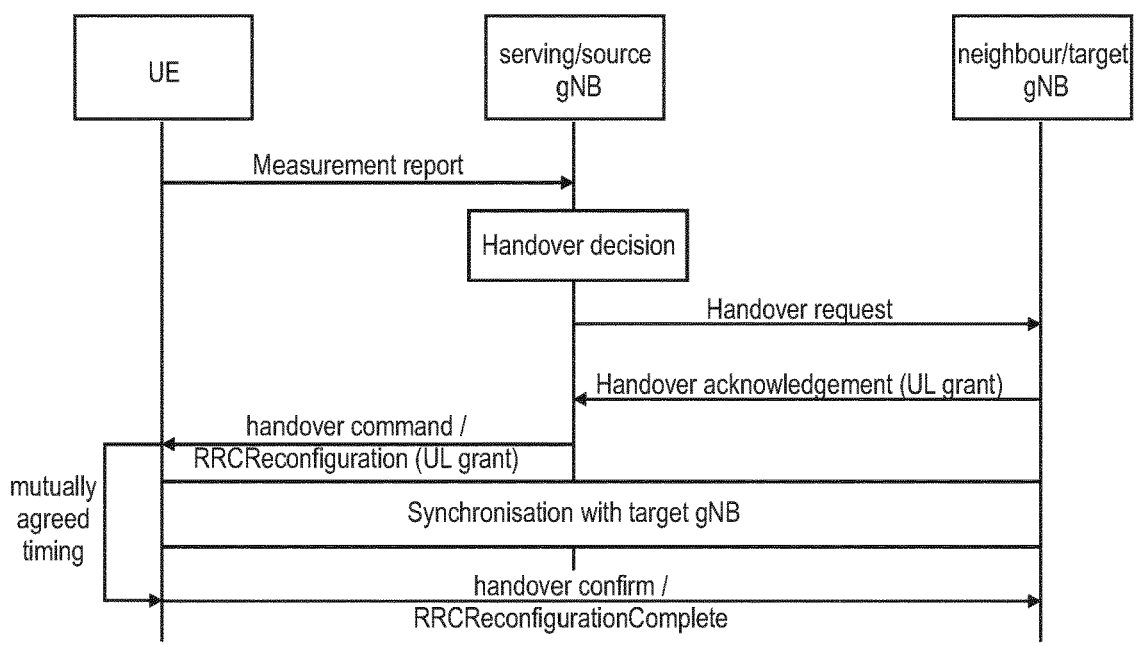
FIG. 16 illustrates the signaling exchange for a RACH-less handover procedure.

In further exemplary implementations of the above-discussed improved handover procedure, the handover can be decided by the source base station based on measurements performed by the UE, in a same or similar manner as explained above for the legacy handover procedure of FIG. 15 and the RACH-less handover of FIG. 16. This exemplary variant of the improved handover procedure is reflected in FIG. 22, which illustrates the measurement report from the UE to the source base station and the subsequent decision by the source base station to handover the UE to the target base station. Correspondingly, the source base station transmits a handover request message to the target base station. It is assumed that the target base station approves on the handover and responds with a handover acknowledgement message. In this exemplary implementation of FIG. 22 it is assumed that the common TA value is transmitted by the target base station to the source base station in the handover acknowledgement message. Additionally, the handover acknowledgement message also indicates radio resources that the UE is supposed to use to transmit the second handover message to the target base station (see UL grant). These radio resources are to be understood as the mutually agreed time at which the UE shall transmit the handover confirm message to the target base station. These radio resources are then forwarded by the source base station to the UE in the handover command message as already explained above.

The source base station behavior as illustrated in FIG. 20 shows that the source base station participates in the improved handover procedure as already apparent from the above explanations. In particular, the source base station at least determines the common timing advance value and the UL timing for the UE's transmission of the second handover message, e.g., based on the corresponding information included in the handover acknowledgement message received from the target base station. The source base station then proceeds to forward the information to the UE in the first handover message, as already discussed above.

As apparent from FIG. 22, and in line with what was already described in connection with FIG. 21, the source base station then proceeds with the handover by transmitting a handover command message to the UE and the UE switching its connection to the target cell.

Moreover, the improved handover procedure may exemplarily also include a further step of the UE determining whether to perform the improved handover procedure or another type of handover (such as the legacy handover procedure of FIG. 15). This may, e.g., be implemented in a similar manner as explained for the RACH-less handover procedure of FIG. 16, namely based on the content of the handover command message. For instance, the UE determines to perform the improved handover procedure when the handover command message includes one or more of the UL grant and the common TA value. On the other hand, the UE may determine to perform a legacy handover procedure (see FIG. 15) when the handover command message does neither include the UL grant nor the common TA value. According to still another implementation, the UE may determine to perform a RACH-less handover procedure (see FIG. 16), when the handover command includes the UL grant but not the common TA value.

Although not illustrated in FIG. 20, the source base station thus controls which type of handover procedure the UE is to perform and can then adapt the content of the handover command message in accordance with the decision. The source base station may, e.g., decide to perform the improved handover procedure or a legacy handover procedure depending on the location of the UE. If the UE is far away from the reference point where the common TA value is calculated, the source base station may decide to perform a legacy handover procedure instead, because it wants to ensure that the target base station can decode the handover confirm message correctly.

The source base station can determine the location of the UE based on one or more of the location information of the base station, the current serving beam of the UE, the beam angle of the UE serving beam and the UE's measurement report.

The UE behavior after the handover procedure may also include that the UE updates the common TA value, e.g., based on the system information broadcast in the target radio cell. Thus, if the UE obtains system information in the target cell with an updated common TA value, the UE uses the updated common TA value rather than the previously-obtained common TA value for further operation. For instance, when performing a random access procedure, the UE may use the updated common TA value, and when transmitting uplink data, the UE may use the updated common TA value+the UE-specific TA value.

According to further exemplarily implementations of the improved handover procedure, several different solutions are presented on how to implement the process that the UE determines the UE-specific timing advance value that is specific to the UE and the target radio cell (see, e.g., last step of FIG. 19, 21, 22).

Figure 23:
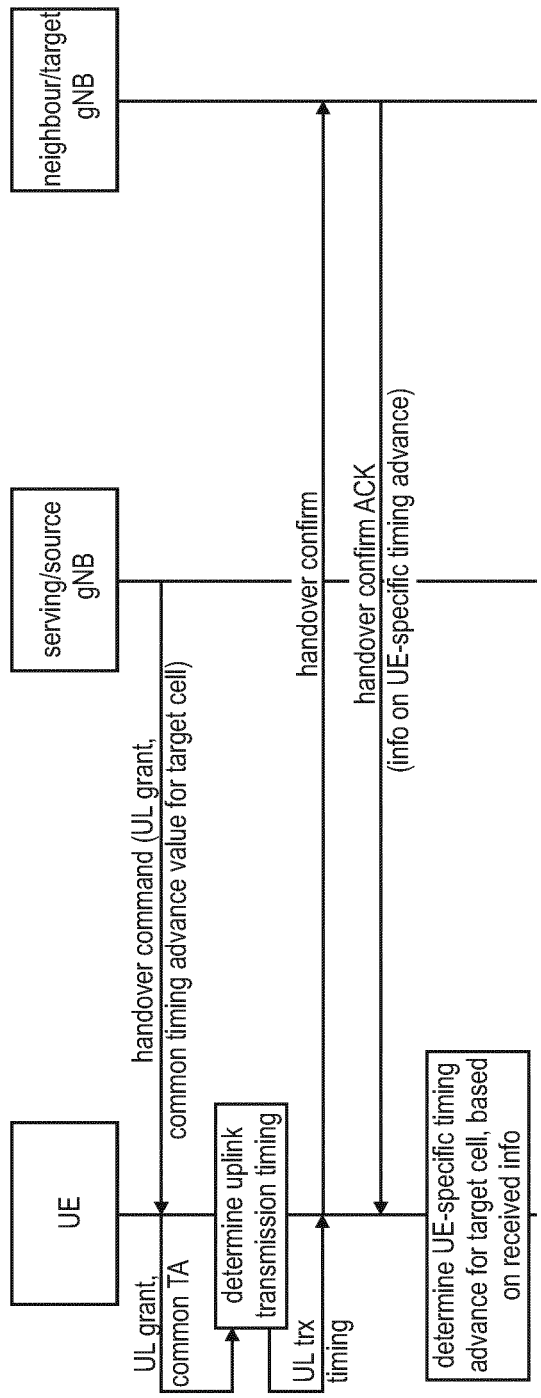
FIG. 23 is a signaling and processing diagram, according to an exemplary implementation for an improved handover procedure, based on a first option on how the UE determines the UE-specific TA value of the target radio cell.

According to a first solution which is illustrated in FIG. 23, the UE obtains information on the UE-specific TA value directly from the target base station in a further message of the handover procedure, after the UE establishes the connection to the target base station. Correspondingly, the UE, based on the received information, can determine the UE-specific TA value. According to one exemplary solution, the UE-specific TA value can be carried in an additional message of the improved handover procedure, e.g., termed RRCReconfigurationCompleteACK message, which is a message transmitted by the target base station to the UE after receiving the RRCReconfigurationComplete message from the UE. For instance, the RRCReconfigurationCompleteACK message is transmitted by the target base station to acknowledge the reception of the RRCReconfigurationComplete message from the UE and may carry the individual TA value. According to an exemplary implementation of the improved handover procedure in the 5G NR standards, the RRCReconfigurationCompleteACK message contains the Timing Advance Command MAC CE as presented above and thereby concludes the improved handover procedure. The value indicated in the TAC MAC CE becomes the individual TA of the UE ($ITA_{target}$).

Before transmitting the UE-specific TA value to the UE, the target base station needs to determine same. It should be noted that the RRCReconfigurationComplete message is transmitted by the UE based on the previously acquired common TA value and using the radio resources indicated by the UL grant. According to one exemplary implementation, if the target base station can decode the RRCReconfigurationComplete message and find that the starting position of the RRCReconfigurationComplete message is T ms later than the starting position indicated to the UE by the UL grant, the target base station knows that the UE-specific TA value is equal to T ms.

Moreover, according to another exemplary implementation, the target base station can configure an UL grant that is larger (in the time domain) than the required size of transmitting a RRCReconfigurationComplete message. Thereby, the target base station facilitates that the RRCReconfigurationComplete message does not overlap in the time domain with other messages of other UEs, thereby facilitating that the message can be correctly decoded by the target base station.

As apparent from the explanations given with respect to FIGS. 13 and 14 above, the individual TA value becomes the more relevant the farer away the UE is located from the reference point of calculating the common TA value. Thus, for a UE being located near the reference point, the individual TA value might not even be necessary to successfully perform the handover, and the RRCReconfigurationCompleteACK message could be optional. On the other hand, for a UE being located far away from the reference point, the individual TA value is necessary to correct the uplink time alignment and to facilitate that further messages are correctly received at the target base station; in such a case, the RRCReconfigurationCompleteACK message would be indeed necessary.

Compared to the second solution (see below), the first solution has the advantage that the UE does not have to observe the DL timing difference (DL propagation time difference) between the source and target cell and does not have to estimate the individual timing advance of the target cell based on the observed timing difference, which can be time and processor consuming.

According to a second solution for determining the UE-specific TA value at the UE, the UE, rather than receiving information on the UE-specific TA value from the target base station, calculates the UE-specific TA value of the target cell making some assumptions and taking into account information available at the UE. To said end, the UE uses the following parameters:

the common timing advance value of the target radio cell,
a UE-specific timing advance value of the source radio cell,
a common timing advance value of the source radio cell, and
a downlink propagation time difference between the source base station and the target base station.

Based on these parameters, the UE can determine the UE-specific TA value of the target cell. The common TA value of the target cell is obtained, e.g., in the handover command message from the source base station as explained above. Further, the common TA value and UE-specific TA value of the source radio cell are already known to the UE from previous communication in the source radio cell. Moreover, the downlink propagation time difference between the source and target base station can be observed by the UE based on signals respectively received from the source and target base stations. Based on the interrelation of these parameters, similar to equation 1 discussed above ($TA_{target}=TA_{source}-2\times(T1-T2)$), the UE can then determine the UE-specific TA value. $TA_{target}$ is CTA_target+ITA_target, and $TA_{source}$ is CTA_source+ITA source.

In one exemplary implementation, the calculation of the UE-specific timing advance value for the UE and the target radio cell is based on the equation.

$$ITA\_target = CTA\_source + ITA\_source - CTA\_target - 2\times(T1-T2),$$ (Equation 2)

The parameter ITA_target is the UE-specific timing advance value for the UE and the target radio cell that is to be calculated. The parameter CTA_source is the common timing advance value of the source radio cell and is known to the UE from its communication with the source base station ITA_source is the UE-specific timing advance value of the source radio cell, CTA_target is the received common timing advance value of the target radio cell, and (T1−T2) is the downlink propagation time difference between the source base station and the target base station.

Figure 24:
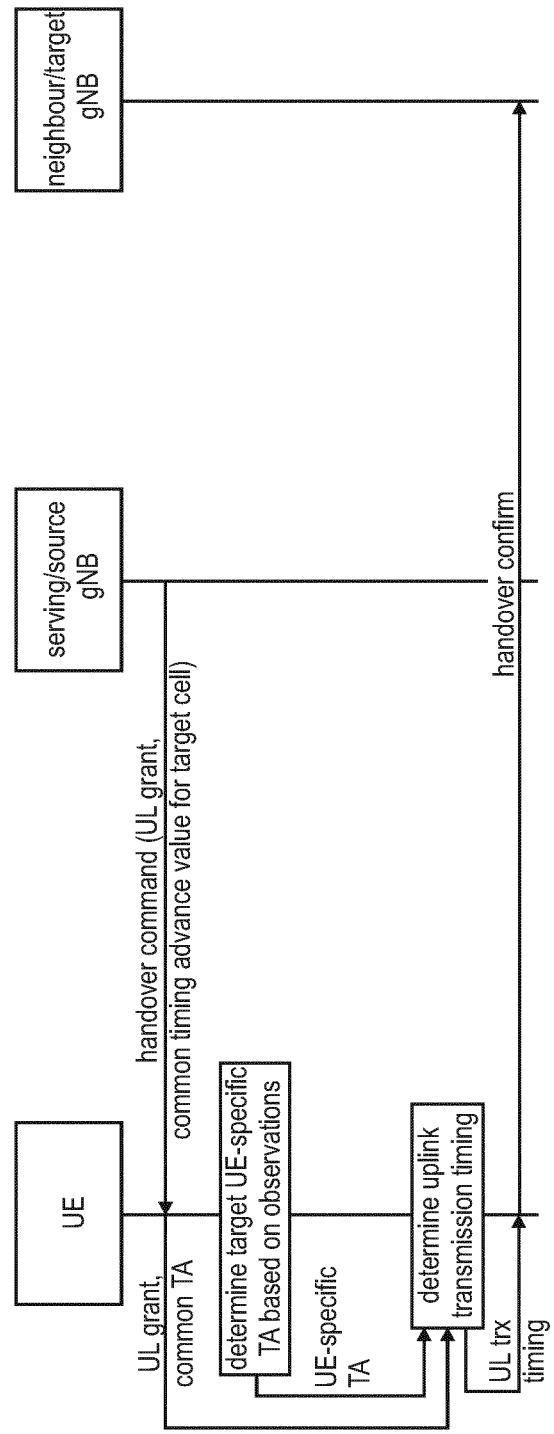
FIG. 24 is a signaling and processing diagram, according to an exemplary implementation for an improved handover procedure, based on a section option on how the UE determines the UE-specific TA value of the target radio cell.

The above-discussed second solution to determine the UE-specific timing advance value for the target cell can be performed, e.g., as depicted in FIG. 21 and FIG. 22, i.e., after the transmission of the handover confirm message. On the other hand, since this second solution does not rely on the transmission of a message from the target base station as the first solution, the second solution allows determining the UE-specific TA value at a much earlier time. According to a further variant of the improved handover procedure illustrated in FIG. 24, the UE, before the UL transmission time to transmit the handover confirm message, performs the step of determining the UE-specific TA value according to the second solution. Therefore, the UE may determine the UL transmission timing of the second handover message (here, e.g., handover confirm message) also based on the UE-specific TA value, in addition to the UL grant information and the common TA value of the target cell.

The second solution has the advantage that the final TA applied to the handover complete message transmission (the RRCReconfigurationComplete message in other exemplary implementations) can be very close to the actual TA experienced by the UE, because the determination of the individual TA value is based on detailed measurements performed at the UE and can be already applied to determine the time-aligned uplink transmission timing. Thus, the handover complete message transmitted by the UE at this time-aligned uplink transmission timing is more likely to be decoded successfully by the target base station.

One possible disadvantage of the second solution is that observing the DL propagation time difference might not provide a correct result. For instance, the DL timing difference between the source and target cell might be more than the SFN (system frame number) difference (e.g., more than 10 ms), in which case the UE might misinterpret the actual DL timing difference because the UE does not know the SFN of the target cell when performing the corresponding measurements (or observations).

A possible way to avoid the above disadvantage is that the source base station instructs the UE to not perform the improved handover procedure but a legacy handover procedure in such a case. The source base station can determine whether this "more than SFN difference" situation occurs, e.g., according to the approximated distance from the source base station to the UE and the approximated distance from the target base station to the UE, which can be roughly obtained based on the satellite and UE position and possibly also based on the beam angle information of the beam that the source base station uses to serve the UE. Thus, when the source base station identifies such a situation, it provides corresponding instructions in the handover command message to the UE to not perform the improved handover procedure but a legacy handover procedure (such as one of the ones described in connection with FIG. 15 or 16). This can be done by generating the appropriate content of the handover command message, such that the UE is able to derive which type of handover is to be performed. As explained above, this may be encoded into the handover command message based on one or more bits or encoded by the presence or absence of the uplink grant and/or the common TA value.

Furthermore, the following exemplary variants of the improved handover procedure facilitate overcoming these disadvantages by allowing the UE to determine whether there is such a "more than SFN difference" situation. According to a first variant, the UE can compare the common TA values of the source and target cell to determine whether this "more than SFN difference" situation is present.

For instance, if the common TA value of the source radio cell is greater than the common TA value of the target radio cell, but the observed DL time difference is negative (i.e., when CTA_source>CTA_target and T1−T2<0), then it is likely that the observed DL propagation difference is wrong, because the common TA values would indicate that the source radio cell is further away than the target radio cell while the observed DL timing difference would indicate that the target radio cell is further away than the source radio cell.

According to a second variant to determine whether there is a "more than SFN difference" situation, the UE obtains system information from the target radio cell (such as one or more of SIBs, the MIB, and PBCH) to acquire the system frame number (SFN) of the target radio cell. Based on the obtained SFN_target, the UE can determine there is a "more than SFN difference" situation if the SFN_target is not identical to the SFN_source; otherwise there is no "more than SFN difference" situation.

According to this second variant, the UE obtains system information from the target cell. Assuming a solution where the common TA value is broadcast in system information by the base station in its radio cell, the UE might thus equally obtain the common TA value of the target cell in this manner, in addition or alternatively to obtaining the common TA value of the target cell in the handover command message from the source base station. In such a case, the handover command message transmitted from the source base station to the UE might not have to include the common TA value for the target cell.

Should the UE determine such a "more than SFN difference" situation, it may decide to not perform the improved handover procedure (possibly despite being instructed to do so), but resorts to another type of handover procedure (such as one of the legacy handover procedure discussed with relation to FIGS. 15 and 16).

For a third solution on how to determine the UE-specific TA value by the UE, it is assumed that the UE is equipped with a Global Navigation Satellite System hardware (GNSS-equipped UE). As mentioned above, the solutions for an improved handover procedure do not make use of the capabilities of GNSS-equipped UEs. However, because the GNSS hardware allows the UE to obtain its location information on the earth, the UE can determine the total timing advance of the target cell (here, e.g., termed GNSS_TA_target) based on the UE location and the target satellite's ephemeris information that are known to the UE.

It is further assumed that the source base station provides the common TA value of the target radio cell in the first handover message (as amply discussed in the previous solutions). The UE can then determine the UE-specific TA value of the target radio cell, based on these two parameters, e.g., by ITA_target=GNSS_TA_target−CTA_target. As presented in connection with the second solution this determination of the GNSS_TA_target and then the determination of the UE-specific TA of the target cell can be performed before the indicated UL transmission timing of the handover confirm message. Thus, the UE can time align the UL transmission timing based on the GNSS_TA_target more accurately than with the CTA_target only.

Moreover, although the ITA_target_value is not used for determining the time-aligned UL transmission timing of the handover confirm message, by thus determining the ITA_target value, the UE has sufficient information to determine an updated total TA value, when receiving an update of the common TA value of the target radio cell (e.g., through system information) after completing the handover to the target radio cell. This determine ITA_target value can then be updated, e.g., by performing a RACH procedure and receiving an updated ITA_target value with the random access response message.

Figure 25:
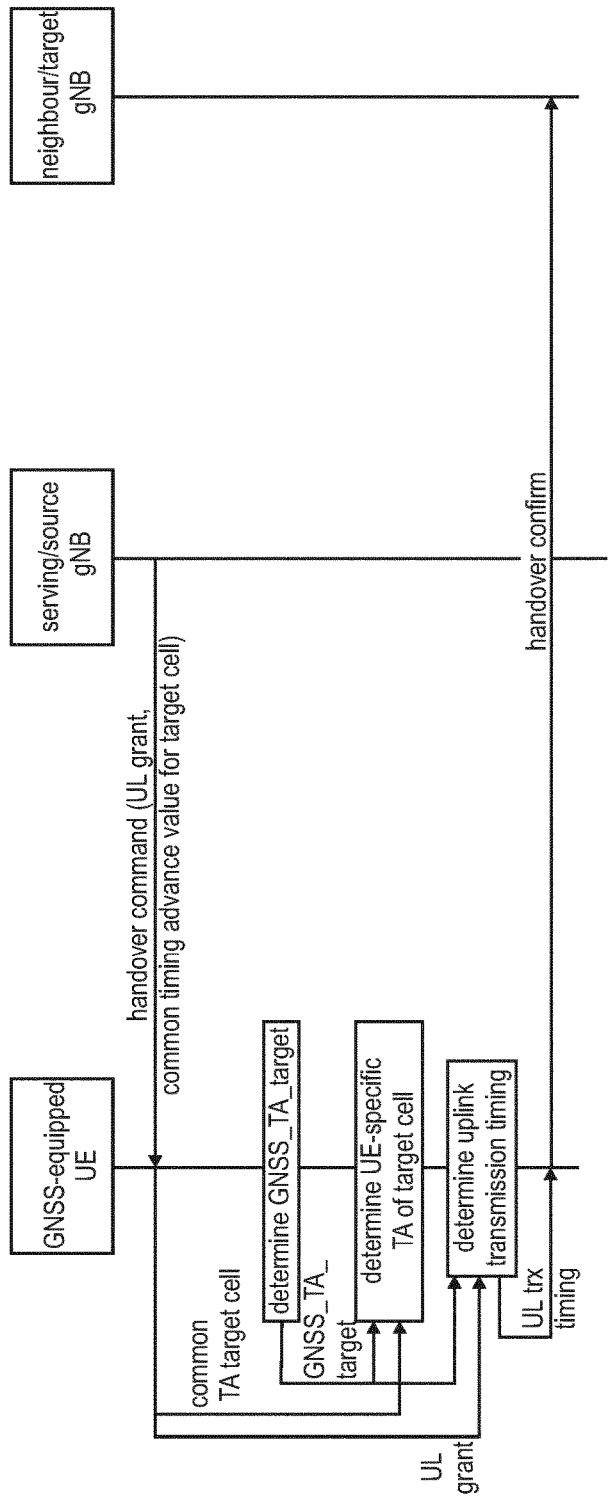
FIG. 25 is a signaling and processing diagram, according to an exemplary implementation for an improved handover procedure, based on a third option on how a GNSS-equipped UE determines the UE-specific TA value of the target radio cell.

A particular implementation is illustrated in FIG. 25. As exemplary assumed therein, the UE obtains the common TA value of the target cell. Then, exemplarily the UE may determine the GNSS_TA_target value (see above). Based on the GNSS_TA_target and the common TA value of the target cell, the UE can determine the UE-specific TA value of the target radio cell. In this exemplary implementation, the UE uses the previously determined GNSS_TA_target as well as the UL grant to determine a time-aligned uplink transmission timing for transmitting the second handover message (here the handover confirm message) to the target base station.

However, determining the GNSS_TA_target value may not always be possible for a GNSS-equipped UE. For instance, if there is a lack of visible satellites (e.g., less than 4 satellites are visible), the UE cannot accurately determine the GNSS_TA_target value. If this situation is determined by the UE, the UE may resort to determining the ITA_target differently than with the above-discussed GNSS-based third solution, e.g., by using the second option that involves observing the DL propagation time difference and calculating the ITA_target using equation 2.

Figure 26:
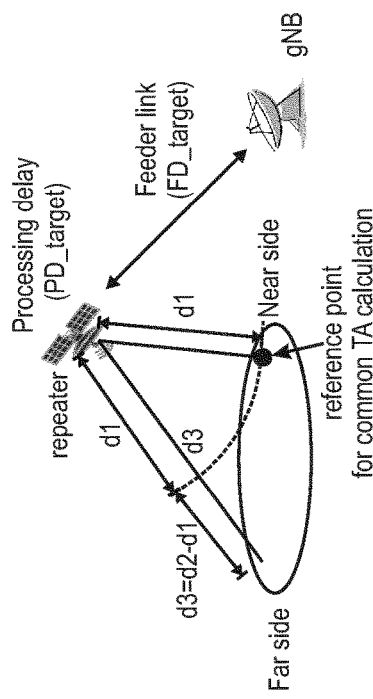
FIG. 26 illustrates a transparent satellite scenario and the additional feeder link delay an processing delay incurred by communication.

In the above-discussed improved handover procedures, no distinction was made as to whether the handover is performed in a regenerative satellite scenario or a transparent satellite scenario. As explained in more detail with reference to FIG. 11 to 14, with a regenerative satellite, the gNB is located in the satellite, whereas in a transparent satellite scenario, the gNB is located on the ground and the satellite acts as a repeater. For the timing advance alignment, the transparent satellite scenarios thus have to also take into account the feeder-link delay (FD_target) between the satellite (repeater) and the gNB located on the ground as well as a satellite processing delay (PD_target) for processing the incoming UL messages from the UE and forwarding the messages further down to the gNB on the ground. The additional delays (FD_target and PD_target) to be taken into account for the timing advance are illustrated in FIG. 26.

Correspondingly, the target gNB broadcasts in its system information a common TA value that takes these two additional delays into account as well. In such transparent satellite scenarios, the common TA value is not only based on the delay d1, but also takes into account the processing delay PD_target and the feeder link delay FD_target:

CTA_target=2×(d1+PD_target+FD_target).

Expressed differently, the common TA value for a transparent satellite scenario is the common TA value for a regenerative satellite case and two times the additional delays FD_target and PD_target for the transparent satellite case:

CTA_target_transS=CTA_target_regS+2×(FD_target+
PD_target)

CTA_source_transS=CTA_source_regS+2×(FD_
source+PD_source)

Therefore, in all the above-discussed improved handover procedures the common TA value to be used depends on the particular satellite scenario. For instance, in a transparent satellite scenario as in FIG. 26, the common TA values (e.g., the CTA_target transmitted to the UE in the handover command message, or the CTA_source) additionally take into account the processing delay and feeder link delay. Expressed differently, the parameters CTA_target_transS and CTA_source_transS specific to a transparent satellite (transS) scenario should be used instead of the CTA_target_regS and CTA_source_regS respectively specific to a regenerative satellite (regS) scenario.

On the other hand, in an alternative variant, the timing advance for a transparent satellite scenario is indicated to the UE based on three different parameters: the common TA value (only taking into account the d1 delay; termed above CTA_source_regS respectively CTA_target_regS), the feeder link delay (FD_source respectively FD_target) and the satellite processing delay (PD_source respectively PD_target). These three parameters relating to the target cell can then be provided from the source base station to the UE in the handover command message, while the source base station determined these three target-cell-related parameters, e.g., from information received in the HO requested acknowledgement message transmitted by the target base station to the source base station.

Correspondingly, the UE then would need to calculate itself the common TA value for the transparent satellite scenario, e.g., using the following formulas already mentioned above:

CTA_target_transS=CTA_target_regS+2×(FD_target+
PD_target)

CTA_source_transS=CTA_source_regS+2×(FD_
source+PD_source)

For some of the above-discussed solutions of the improved handover procedure, it was assumed that the DL delay (e.g., gNB→satellite→UE) is the same as the UL delay (UE→satellite→gNB). For instance, equations 1 and 2 mentioned above are based on this assumption. However, this might not always be the case for several reasons, such that the DL delay and the UL are not identical. For instance, the downlink and uplink transmissions may use different frequency bands, and/or the satellite processing may be different for uplink and downlink.

Therefore, such solutions that are based on the "DL delay=UL delay" assumption cannot be used when the UL and DL delays are different. To overcome this restriction, according to variants of the above-discussed improved handover procedure, the difference between the downlink delay and uplink delay is additionally taken into account. For instance, Equation 1 ($TA_{target}=TA_{source}-2\times(T1-T2)$) should be adjusted.

The parameter Off_source is the time offset between the DL and UL delay in the source radio cell. This parameter can be obtained by the UE in the source radio cell, e.g., via system information in a suitable System Information Block. A positive value of Off_source can be, e.g., understood to mean that the UL delay is longer than the DL delay in the source radio cell by the indicated value of Off_source. Conversely, a negative vale of Off_source can be, e.g., understood to mean that the UL delay is shorter than the DL delay in the source radio cell by the indicated value of Off_source.

In an analogous manner, the parameter Off_target is the time offset between the DL and UL delay in the target radio cell. This parameter can be obtained by the UE in the source radio cell, e.g., via the first handover message (e.g., in some implementations the handover command message, or in other implementations the RRCReconfiguration message), e.g., together with the common TA value of the target radio cell. A positive value of Off_target can be, e.g., understood to mean that the UL delay is longer than the DL delay in the target radio cell by the indicated value of Off_target. Conversely, a negative vale of Off_target can be, e.g., understood to mean that the UL delay is shorter than the DL delay in the target radio cell by the indicated value of Off_target.

Based on the additional parameters Off_source and Off_target, Equation 1 can be revised into Equation 3 as follows.

$$TA_{source}=2*T1+Off_{source},$$

$$TA_{target}=2*T2+Off_{target},$$

$$TA_{target}-TA_{source}=2T2-2T1+Off_{target}-Off_{source},$$

$$TA_{target}=TA_{source}-2(T1-T2)+Off_{target}-Off_{source} \quad \text{(Equation 3)}$$

Correspondingly, in such scenarios where the uplink and downlink delays are not identical in a radio cell, Equation 3 should be used instead of using Equation 1.

Therefore, Equation 2 would be changed into Equation 4, where the parameters TA_target and TA_source of Equation 3 are replaced with (CTA_target+ITA_target) respectively (CTA_source+ITA_source):

$$CTA_{target}+ITA_{target}=CTA_{source}+ITA_{source}-2(T1-T2)+Off_{target}-Off_{source}$$

$$ITA_{target}=CTA_{source}+ITA_{source}-CTA_{target}-2(T1-T2)+Off_{target}-Off_{source} \quad \text{(Equation 4)}$$

In those solutions discussed above that are based on Equation 2, the UE can then use Equation 4 instead of Equation 2 to determine the UE-specific TA value of the target cell. As discussed already with respect to Equation 2, the UE should be able to acquire all the parameters of Equation 4 to determine the UE-specific TA value of the target radio cell ITA_target. For instance, Off_target could be acquired by the UE via the first handover message, as already mentioned in connection with Equation 3.

Correspondingly, the UE may first determine whether the downlink propagation delay in the source radio cell is the same as the uplink propagation delay in the source radio cell or not, and also whether the downlink propagation delay in the target radio cell is the same as the uplink propagation delay in the target radio cell or not. According to one exemplary implementation, the UE is informed by the source base station if this is the case. For instance, when the parameters Off_source and Off_target are included in the handover command message, the UE determines that the assumption of UL delay=DL delay is not true and that it has to use the different equations.

In particular, depending on the result of the determination, the suitable Equations 1, 2, 3, or 4 are used, as explained above. In particular, if in the source radio cell and in the target radio cell the respective UL and DL delays are substantially the same, Equations 1 and 2 can be used. On the other hand, if in the source radio cell or in the target radio cell the respective UL and DL delays are different from one another, Equations 3 and 4 can be used.

Further Aspects According to a first aspect, a user equipment, UE, comprising a receiver that receives, from a source base station of a source radio cell, a common timing advance value for a target radio cell. The UE is connected to the source radio cell and is involved in a handover procedure to hand over the UE from the source radio cell to the target radio cell. Further, the common timing advance value is received from the source base station in a first message of the handover procedure, which also comprises a timing indication for transmitting a second message from the UE to the target base station. Then, a processor of the UE determines a first uplink timing of uplink transmissions to the target base station with respect to downlink transmissions from the target base station, based on the received common timing advance value and the timing indication. A transmitter of the UE transmits a second message of the handover procedure to the target base station based on the determined uplink timing. The processor determines a UE-specific timing advance value, specific to the UE and the target radio cell, to be used by the UE for performing uplink transmissions in the target radio cell.

According to a second aspect provided in addition to the first aspect, the processor determines second uplink timings for transmitting messages of a random access procedure to the target base station, based on the common timing advance value and not based on the UE-specific timing advance value. Further, the processor determines third uplink timings for transmitting uplink data to the target base station, based on the common timing advance value and the UE-specific timing advance value.

According to a third aspect provided in addition to the first or second aspect, the receiver receives a third message of the handover procedure from the target base station, comprising information on the UE-specific timing advance value for the UE and the target radio cell, and the processor determines the UE-specific timing advance value for the UE and the target radio cell from the received information on the UE-specific timing advance value.

According to a fourth aspect provided in addition to one of the first to third aspects, the processor determines the UE-specific timing advance value for the UE and the target radio cell, based on a calculation using
  the received common timing advance value of the target radio cell,
  a UE-specific timing advance value of the source radio cell,
  a common timing advance value of the source radio cell,
  a downlink propagation time difference between the source base station and the target base station.

Further, the calculation is performed before determining of the first uplink timing of uplink transmissions to the target base station, and the determining of the first uplink timing is further based on the calculated UE-specific timing advance value. In an optional implementation, the calculation of the UE-specific timing advance value for the UE and the target radio cell is based on the equation:

$$ITA\_target=CTA\_source+ITA\_source-CTA\_target-2(T2-T1).$$

The parameter ITA_target is the UE-specific timing advance value for the UE and the target radio cell, CTA_source is the common timing advance value of the source radio cell, ITA_source is the UE-specific timing advance value of the source radio cell, CTA_target is the received common timing advance value of the target radio cell, and (T2-T1) is the downlink propagation time difference between the source base station and the target base station.

According to a fifth aspect, provided in addition to the fourth aspect, when the downlink propagation delay between the UE and the source base station is not the same as the uplink propagation delay between the UE and the source base station, the determining of the UE specific timing advance value additionally takes into account the time offset between the downlink and uplink delay in the source radio cell and the time offset between the downlink and uplink delay in the target radio cell. In an optional implementation, the calculation of the UE-specific timing advance value for the UE and the target radio cell is based on the equation:

$$ITA_{target}=CTA_{source}+ITA_{source}-CTA_{target}-2(T2-T1)+Off_{target}-Off_{source}$$

The parameter Off_source is the time offset between the downlink and uplink delay in the source radio cell, and Off_target is the time offset between the downlink and uplink delay in the target radio cell.

According to a sixth aspect, provided in addition to the any one of the first to fifth aspects, the UE is equipped with Global Navigation Satellite System, GNNSS, circuitry, which determines a total timing advance value of the target radio cell. Determining the UE-specific timing advance value for the target radio cell is based on the total timing advance value for the target radio cell and the received common timing advance value for the target radio cell. In an optional implementation, the UE-specific timing advance value for the target radio cell is the total timing advance value for the target radio cell minus the received common timing advance value for the target radio cell.

According to a seventh aspect provided in addition to the sixth aspect, the processor determines whether determining the total timing advance value of the target radio cell using the GNSS circuitry is possible. If not possible, the processor determines to not determine the UE-specific timing advance value for the target radio cell based on the total timing advance value of the target radio cell using the GNSS circuitry, but to determine the UE-specific timing advance value of the target radio cell according to the above third or fourth aspects.

According to an eighth aspect provided in addition to one of the first to seventh aspects, a common timing advance value is common to all UEs in the source/target radio cell and is calculated with respect to a reference point in the source/target radio cell. A UE-specific timing advance value is specific to the one UE in the source/target radio cell and is based on the location of the UE in the source/target radio cell.

According to a ninth aspect provided in addition to any one of the first to eighth aspects, the processor determines that the first message of the handover procedure instructs the UE to participate in the handover without performing a random access procedure with the target base station. In an optional implementation, the processor determines to perform a handover without performing the random access procedure when the first message comprises the timing indication.

According to a tenth aspect, provided in addition to any one of the first to ninth aspects, the first message of the handover procedure, comprising the common timing advance value of the target cell and the timing indication, is a handover command message of the handover procedure. The handover command message instructs the UE how to reconfigure a radio resource configuration of the UE in order to establish a connection to the target radio cell. The second message of the handover procedure is an RRCReconfigurationComplete message, indicating to the target base station that the radio resource reconfiguration of the UE for establishing the connection of the UE to the target base station is complete.

According to an eleventh aspect, provided in addition to any one of the first to tenth aspects, the UE is connected via a source satellite to the source base station located on the ground, wherein the common timing advance value of the source radio cell takes into account a first delay experienced by communication when being transmitted from the source satellite and the source base station located on the ground and takes into account a second delay experienced by communication when being processed in the source satellite.

According to a twelfth aspect, a base station is provided which comprises a transmitter that transmits to a user equipment, UE, a common timing advance value for a target radio cell. The UE is connected to a radio cell of the base station. The base station, as a source base station, is involved in a handover procedure to hand over the UE from the radio cell, as a source radio cell, to the target radio cell. The common timing advance value is transmitted by the base station, as the source base station, in a first message of the handover procedure. The first message of the handover procedure further comprises a timing indication for transmitting a second message from the UE to the target base station.

According to a thirteenth aspect, provided in addition to the twelfth aspect, the base station comprises a processor that determines the common timing advance value for the target radio cell and determines the timing indication for transmitting the second message from the UE to the target base station. In an optional implementation, the base station comprises a receiver that receives, from the target base station of the target radio cell, information on the common timing advance value for the target radio cell and information on the timing indication for transmitting the second message from the UE to the target base station.

According to a fourteenth aspect, provided in addition to the twelfth or thirteenth aspect, the base station, as a target base station, is involved in another handover procedure to handover another UE from another source radio cell to the radio cell, as the target radio cell. The base station, as the target base station, comprises the transmitter, which in operation, transmits a common timing advance value of the radio cell of the base station, to the another source radio base station controlling the another source radio cell, in a first message of the another handover procedure. The first message of the another handover procedure further comprises a timing indication for transmitting another message from the another UE to the base station. The base station, as the target base station, comprises a receiver that receives from the another UE the other message of the another handover procedure, transmitted based on the common timing advance value of the radio cell and the timing indication for transmitting the other message.

According to a fifteenth aspect, a method is provided comprising the following steps performed by a user equipment, UE:

receiving, from a source base station of a source radio cell, a common timing advance value for a target radio cell, the UE being connected to the source radio cell and being involved in a handover procedure to hand over the UE from the source radio cell to the target radio cell, wherein the common timing advance value is received from the source base station in a first message of the handover procedure, wherein the first message of the handover procedure further comprises a timing indication for transmitting a second message from the UE to the target base station, determining a first uplink timing of uplink transmissions to the target base station with respect to downlink transmissions from the target base station, based on the received common timing advance value and the timing indication, transmitting a second message of the handover procedure to the target base station based on the determined uplink timing, determining a UE-specific timing advance value, specific to the UE and the target radio cell, to be used by the UE for performing uplink transmissions in the target radio cell.

Hardware and Software Implementation of the Present Disclosure

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC (integrated circuit), a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/ telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT).

The communication may include exchanging data through, for example, a cellular system, a wireless LAN system, a satellite system, etc., and various combinations thereof.

The communication apparatus may comprise a device such as a controller or a sensor, which is coupled to a communication device performing a function of communication described in the present disclosure. For example, the communication apparatus may comprise a controller or a sensor that generates control signals or data signals, which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The invention claimed is:

1. A user equipment (UE) comprising:
a receiver, which in operation, receives, from a source base station of a source radio cell, a common timing advance value for a target radio cell, the UE being connected to the source radio cell and being involved in a handover procedure to hand over the UE from the source radio cell to the target radio cell, wherein the common timing advance value is received from the source base station in a first message of the handover procedure, wherein the first message of the handover procedure further comprises a timing indication for transmitting a second message from the UE to the target base station,
a processor, which in operation,
determines a first uplink timing of uplink transmissions to the target base station with respect to downlink transmissions from the target base station, based on the received common timing advance value and the timing indication, and
a transmitter, which in operation, transmits a second message of the handover procedure to the target base station based on the determined first uplink timing,
the processor, when in operation, determines a UE-specific timing advance value, specific to the UE and the target radio cell, to be used by the UE for performing uplink transmissions in the target radio cell, wherein the UE-specific timing advance value for the UE and the target radio cell is determined as:

$$CTA\_source + ITA\_source - CTA\_target - 2(T2-T1) + Off\_target - Off\_source,$$

wherein CTA source is a common timing advance value of the source radio cell, ITA source is a UE-specific timing advance value for the UE and the source radio cell, CTA target is the received common timing advance value of the target radio cell, (T2-T1) is a downlink propagation time difference between the source base station and the target base station, Off target is a time offset between downlink and uplink delay in the target radio cell and is obtained by the UE from the first message and Off source is the time offset between the downlink and uplink delay in the source radio cell.

2. The UE according to claim 1, wherein the processor, when in operation, determines second uplink timings for transmitting messages of a random access procedure to the target base station, based on the common timing advance value and not based on the UE-specific timing advance value, and
wherein the processor, when in operation, determines third uplink timings for transmitting uplink data to the target base station, based on the common timing advance value and the UE-specific timing advance value.

3. The UE according to claim 1, wherein the receiver, when in operation, receives a third message of the handover procedure from the target base station, comprising information on the UE-specific timing advance value for the UE and the target radio cell, and the processor determines the UE-specific timing advance value for the UE and the target radio cell from the received information on the UE-specific timing advance value.

4. The UE according to claim 1, wherein the processor, when in operation, determines the UE-specific timing advance value for the UE and the target radio cell
   before determining the first uplink timing of uplink transmissions to the target base station, and the determining of the first uplink timing is further based on the calculated UE-specific timing advance value.

5. The UE according to claim 4, wherein when the downlink propagation delay between the UE and the source base station is not the same as the uplink propagation delay between the UE and the source base station.

6. The UE according to claim 1, wherein the UE is equipped with Global Navigation Satellite System (GNSS) circuitry, which in operation, determines a total timing advance value of the target radio cell, and
   wherein determining the UE-specific timing advance value for the UE and the target radio cell is based on the total timing advance value for the target radio cell and the received common timing advance value for the target radio cell, wherein the UE-specific timing advance value for the target radio cell is the total timing advance value for the target radio cell minus the received common timing advance value for the target radio cell.

7. The UE according to claim 6, wherein the processor determines whether determining the total timing advance value of the target radio cell using the GNSS circuitry is possible,
   and if not possible, the processor determines to not determine the UE-specific timing advance value for the target radio cell based on the total timing advance value of the target radio cell using the GNSS circuitry, but to determine the UE-specific timing advance value of the target radio cell.

8. The UE according to claim 1, wherein the common timing advance value for the target radio cell is common to all UEs in the target radio cell and is calculated with respect to a reference point in the target radio cell, and a common timing advance value for the source radio cell is common to all UEs in the source radio cell and is calculated with respect to a reference point in the source radio cell and
   wherein the UE-specific timing advance value for the UE and the target radio cell and is based on a location of the UE in the target radio cell, and a UE-specific timing advance value for the UE and the source radio cell and is based on a location of the UE in source radio cell.

9. The UE according to claim 1, wherein the processor, when in operation, determines that the first message of the handover procedure instructs the UE to participate in the handover without performing a random access procedure with the target base station,
   wherein the processor determines to perform a handover without performing the random access procedure when the first message comprises the timing indication.

10. The UE according to claim 1, wherein the first message of the handover procedure, comprising the common timing advance value of the target cell and the timing indication, is a handover command message of the handover procedure, wherein the handover command message instructs the UE how to reconfigure a radio resource configuration of the UE in order to establish a connection to the target radio cell,
    wherein the second message of the handover procedure is an RRCReconfigurationComplete message, indicating to the target base station that the radio resource reconfiguration of the UE for establishing the connection of the UE to the target base station is complete.

11. The UE according to claim 1, wherein the UE is connected via a source satellite to the source base station that is terrestrial, wherein the common timing advance value of the source radio cell takes into account a first delay experienced by communication when being transmitted from the source satellite and the source base station located on the ground and takes into account a second delay experienced by communication when being processed in the source satellite.

12. A system, comprising:
    a base station including:
       a transmitter, which in operation, transmits to a user equipment (UE) a common timing advance value for a target radio cell, the UE being connected to a radio cell of the base station, and wherein the base station, as a source base station, is involved in a handover procedure to hand over the UE from the radio cell, as a source radio cell, to the target radio cell, wherein the common timing advance value is transmitted by the base station, as the source base station, in a first message of the handover procedure, wherein the first message of the handover procedure further comprises a timing indication for transmitting a second message from the UE to the target base station; and
    the UE including:
       a processor, when in operation, determines a UE-specific timing advance value, specific to the UE and the target radio cell, to be used by the UE for performing uplink transmissions in the target radio cell, wherein the UE-specific timing advance value for the UE and the target radio cell is determined as:

$$ITA\_target = CTA\_source + ITA\_source - CTA\_target - 2(T2-T1) + \text{Off\_target} - \text{Off\_source},$$

wherein CTA source is a common timing advance value of the source radio cell, ITA source is a UE-specific timing advance value for the UE and the source radio cell, CTA target is the common timing advance value of the target radio cell, (T2-T1) is a downlink propagation time difference between the source base station and the target base station, Off target is a time offset between downlink and uplink delay in the target radio cell and is obtained by the UE from the first message and Off source is the time offset between the downlink and uplink delay in the source radio cell.

13. The system according to claim 12, wherein the base station further comprises a processor, which in operation, determines the common timing advance value for the target radio cell and determines the timing indication for transmitting the second message from the UE to the target base station,
    wherein the base station comprises a receiver, which in operation, receives, from the target base station of the target radio cell, information on the common timing advance value for the target radio cell and information on the timing indication for transmitting the second message from the UE to the target base station.

14. The system according to claim 12, wherein the base station, as a target base station, is involved in another handover procedure to handover another UE from another source radio cell to the radio cell, as the target radio cell, wherein the base station, as the target base station, comprises the transmitter, which in operation, transmits a common timing advance value of the radio cell of the base station, to the another source radio base station controlling the another source radio cell, in a first message of the another handover procedure, wherein the first message of the another handover procedure comprises a timing indication for transmitting another message from the another UE to the base station, and wherein the base station, as the target base station, comprises a receiver, which in operation, receives from the another UE the other message of the another handover procedure, transmitted based on the common timing advance value of the radio cell and the timing indication for transmitting the other message.

15. A method comprising the following steps performed by a user equipment (UE):

receiving, from a source base station of a source radio cell, a common timing advance value for a target radio cell, the UE being connected to the source radio cell and being involved in a handover procedure to hand over the UE from the source radio cell to the target radio cell, wherein the common timing advance value is received from the source base station in a first message of the handover procedure, wherein the first message of the handover procedure further comprises a timing indication for transmitting a second message from the UE to the target base station, determining a first uplink timing of uplink transmissions to the target base station with respect to downlink transmissions from the target base station, based on the received common timing advance value and the timing indication, transmitting a second message of the handover procedure to the target base station based on the determined uplink timing, and determining a UE-specific timing advance value, specific to the UE and the target radio cell, to be used by the UE for performing uplink transmissions in the target radio cell, wherein the UE-specific timing advance value for the UE and the target radio cell is determined as:

$$\text{CTA source} + \text{ITA source} - \text{CTA target} - 2(T2-T1) + \text{Off target} - \text{Off source},$$

wherein CTA source is a common timing advance value of the source radio cell, ITA source is a UE-specific timing advance value for the UE and the source radio cell, CTA target is the received common timing advance value of the target radio cell, (T2-T1) is a downlink propagation time difference between the source base station and the target base station, Off target is a time offset between downlink and uplink delay in the target radio cell and is obtained by the UE from the first message and Off source is the time offset between the downlink and uplink delay in the source radio cell.

* * * * *